United States Patent
Zehner et al.

(10) Patent No.: US 7,119,759 B2
(45) Date of Patent: Oct. 10, 2006

(54) MACHINE-READABLE DISPLAYS

(75) Inventors: Robert W. Zehner, Arlington, MA (US); Russell J. Wilcox, Natick, MA (US); Barrett Comiskey, Stanford, CA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/904,233

(22) Filed: Oct. 29, 2004

(65) Prior Publication Data

US 2005/0122564 A1    Jun. 9, 2005

Related U.S. Application Data

(63) Continuation-in-part of application No. 09/564,043, filed on May 3, 2000, now abandoned.

(60) Provisional application No. 60/481,576, filed on Oct. 29, 2003, provisional application No. 60/132,178, filed on May 3, 1999.

(51) Int. Cl.
*G09G 3/20* (2006.01)

(52) U.S. Cl. .......................... 345/1.1; 345/1.2; 345/2.1; 345/2.2; 345/2.3; 345/107; 345/204; 345/205; 345/211; 359/296

(58) Field of Classification Search .................. 345/1.1, 345/1.2, 2.1, 2.2, 2.3, 204, 205, 107, 211; 359/265, 290, 296; 715/764, 864
See application file for complete search history.

(56) References Cited

U.S. PATENT DOCUMENTS

| 3,036,388 | A | 5/1962 | Tate |
| 3,668,106 | A | 6/1972 | Ota |
| 3,756,693 | A | 9/1973 | Ota |
| 3,767,392 | A | 10/1973 | Ota |
| 3,792,308 | A | 2/1974 | Ota |
| 3,870,517 | A | 3/1975 | Ota et al. |
| 3,892,568 | A | 7/1975 | Ota |
| 3,936,816 | A | 2/1976 | Murata |
| 3,972,040 | A | 7/1976 | Hilsum et al. |
| 4,068,927 | A | 1/1978 | White |
| 4,147,932 | A | 4/1979 | Lewis |
| 4,185,621 | A | 1/1980 | Morrow |
| 4,270,290 | A * | 6/1981 | Eckert .......................... 40/389 |
| 4,301,407 | A | 11/1981 | Koslar |
| 4,324,456 | A | 4/1982 | Dalisa |
| 4,418,346 | A | 11/1983 | Batchelder |
| 4,450,440 | A | 5/1984 | White |
| 4,500,880 | A | 2/1985 | Gomersall et al. |
| 4,640,583 | A | 2/1987 | Hoshikawa et al. |
| 4,643,528 | A | 2/1987 | Bell, Jr. |
| 4,648,956 | A | 3/1987 | Marshall et al. |

(Continued)

FOREIGN PATENT DOCUMENTS

EP    0 618 715 A1    10/1994

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Bipin Shalwala
*Assistant Examiner*—Vincent E. Kovalick
(74) *Attorney, Agent, or Firm*—David J. Cole

(57) ABSTRACT

A reflective electro-optic display (200) has a bar code display area (206) arranged to display a bar code readable by a bar code scanner.

20 Claims, 13 Drawing Sheets

U.S. PATENT DOCUMENTS

| | | | |
|---|---|---|---|
| 4,655,897 A * | 4/1987 | DiSanto et al. | 359/296 |
| 4,700,183 A | 10/1987 | White | |
| 4,703,573 A | 11/1987 | Montgomery et al. | |
| 4,707,080 A | 11/1987 | Fergason | |
| 4,748,366 A | 5/1988 | Taylor | |
| 4,772,820 A | 9/1988 | DiSanto et al. | |
| 4,794,390 A | 12/1988 | Lippman | |
| 4,821,291 A | 4/1989 | Stevens et al. | |
| 4,870,677 A | 9/1989 | DiSanto et al. | |
| 4,882,564 A * | 11/1989 | Monroe et al. | 340/449 |
| 4,911,536 A * | 3/1990 | Ditzik | 349/22 |
| 4,949,081 A | 8/1990 | Keller et al. | |
| 4,962,466 A | 10/1990 | Revesz et al. | |
| 5,016,002 A | 5/1991 | Levanto | |
| 5,082,351 A | 1/1992 | Fergason | |
| 5,109,354 A | 4/1992 | Yamashita et al. | |
| 5,167,508 A | 12/1992 | McTaggart | |
| 5,172,314 A | 12/1992 | Poland et al. | |
| 5,194,852 A | 3/1993 | More et al. | |
| 5,256,500 A | 10/1993 | Ishimoto | |
| 5,266,934 A | 11/1993 | Van Almen | |
| 5,345,231 A | 9/1994 | Koo et al. | |
| 5,354,979 A * | 10/1994 | Adelson et al. | 235/491 |
| 5,359,346 A | 10/1994 | DiSanto et al. | |
| 5,374,815 A | 12/1994 | Waterhouse et al. | |
| 5,389,945 A | 2/1995 | Sheridon | |
| 5,450,069 A | 9/1995 | DiSanto et al. | |
| 5,450,491 A * | 9/1995 | McNair | 713/184 |
| 5,483,263 A * | 1/1996 | Bird et al. | 345/207 |
| 5,484,292 A | 1/1996 | McTaggart | |
| 5,485,176 A | 1/1996 | Ohara et al. | |
| 5,497,171 A | 3/1996 | Teres et al. | |
| 5,500,635 A | 3/1996 | Mott | |
| 5,508,720 A | 4/1996 | DiSanto et al. | |
| 5,515,074 A * | 5/1996 | Yamamoto | 345/101 |
| 5,517,407 A | 5/1996 | Weiner | |
| 5,521,371 A * | 5/1996 | Hotta et al. | 235/487 |
| 5,534,888 A | 7/1996 | Lebby et al. | |
| 5,538,430 A | 7/1996 | Smith et al. | |
| 5,543,589 A | 8/1996 | Buchana et al. | |
| 5,548,282 A * | 8/1996 | Escritt et al. | 340/5.91 |
| 5,575,554 A | 11/1996 | Guritz | |
| 5,650,247 A | 7/1997 | Taniguchi et al. | |
| 5,650,872 A | 7/1997 | Saxe et al. | |
| 5,672,381 A | 9/1997 | Rajan | |
| 5,704,049 A | 12/1997 | Briechle | |
| 5,707,081 A | 1/1998 | Luna | |
| 5,708,525 A | 1/1998 | Sheridon | |
| 5,709,976 A | 1/1998 | Malhotra | |
| 5,714,270 A | 2/1998 | Malhotra et al. | |
| 5,715,514 A | 2/1998 | Williams et al. | |
| 5,722,781 A | 3/1998 | Yamaguchi | |
| 5,725,935 A | 3/1998 | Rajan | |
| 5,731,116 A | 3/1998 | Matsuo et al. | |
| 5,742,879 A | 4/1998 | Altrieth, III | |
| 5,745,094 A | 4/1998 | Gordon, II et al. | |
| 5,751,257 A | 5/1998 | Sutherland | |
| 5,751,433 A | 5/1998 | Narendranath et al. | |
| 5,751,434 A | 5/1998 | Narendranath et al. | |
| 5,760,761 A | 6/1998 | Sheridon | |
| 5,761,485 A | 6/1998 | Munyan | |
| 5,767,978 A | 6/1998 | Revankar et al. | |
| 5,777,782 A | 7/1998 | Sheridon | |
| 5,808,783 A | 9/1998 | Crowley | |
| 5,835,577 A | 11/1998 | Disanto et al. | |
| 5,872,552 A | 2/1999 | Gordon, II et al. | |
| 5,892,504 A * | 4/1999 | Knapp | 345/204 |
| 5,930,026 A | 7/1999 | Jacobson et al. | |
| 5,931,764 A * | 8/1999 | Freeman et al. | 482/4 |
| 5,961,804 A * | 10/1999 | Jacobson et al. | 204/606 |
| 5,963,456 A | 10/1999 | Klein et al. | |
| 5,978,052 A | 11/1999 | Ilcisin et al. | |
| 5,995,271 A * | 11/1999 | Zieba et al. | 359/265 |
| 6,005,817 A | 12/1999 | Gudesen et al. | |
| 6,014,247 A | 1/2000 | Winter et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,064,615 A | 5/2000 | Gudesen | |
| 6,067,185 A | 5/2000 | Albert et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,307,919 B1 | 10/2001 | Yoked | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,340,957 B1 | 1/2002 | Adler et al. | |
| 6,348,908 B1 | 2/2002 | Richley et al. | |
| 6,370,019 B1 | 4/2002 | Matthies et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,418,092 B1 | 7/2002 | Gudesen | |
| 6,422,687 B1 | 7/2002 | Jacobson | |
| 6,445,374 B1 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B1 | 11/2002 | Turner et al. | |
| 6,493,396 B1 | 12/2002 | Nguyen et al. | |
| 6,498,114 B1 | 12/2002 | Amundson et al. | |
| 6,504,524 B1 | 1/2003 | Gates et al. | |
| 6,506,438 B1 | 1/2003 | Duthaler et al. | |
| 6,512,354 B1 | 1/2003 | Jacobson et al. | |
| 6,515,649 B1 | 2/2003 | Albert et al. | |
| 6,518,949 B1 | 2/2003 | Drzaic | |
| 6,521,489 B1 | 2/2003 | Duthaler et al. | |
| 6,531,997 B1 | 3/2003 | Gates et al. | |
| 6,535,197 B1 | 3/2003 | Comiskey et al. | |
| 6,538,801 B1 | 3/2003 | Jacobson et al. | |
| 6,545,291 B1 | 4/2003 | Amundson et al. | |
| 6,580,545 B1 | 6/2003 | Morrison et al. | |
| 6,639,578 B1 | 10/2003 | Comiskey et al. | |
| 6,652,075 B1 | 11/2003 | Jacobson | |
| 6,657,772 B1 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |

| | | |
|---|---|---|
| 6,683,333 B1 | 1/2004 | Kazlas et al. |
| 6,693,620 B1 | 2/2004 | Herb et al. |
| 6,704,133 B1 | 3/2004 | Gates et al. |
| 6,710,540 B1 | 3/2004 | Albert et al. |
| 6,721,083 B1 | 4/2004 | Jacobson et al. |
| 6,724,519 B1 | 4/2004 | Comiskey et al. |
| 6,727,881 B1 | 4/2004 | Albert et al. |
| 6,738,050 B1 | 5/2004 | Comiskey et al. |
| 6,750,473 B1 | 6/2004 | Amundson et al. |
| 6,753,830 B1 | 6/2004 | Gelbman |
| 6,753,999 B1 | 6/2004 | Zehner et al. |
| 6,788,449 B1 | 9/2004 | Liang et al. |
| 6,816,147 B1 | 11/2004 | Albert |
| 6,819,471 B1 | 11/2004 | Amundson et al. |
| 6,822,782 B1 | 11/2004 | Honeyman et al. |
| 6,825,068 B1 | 11/2004 | Denis et al. |
| 6,825,829 B1 | 11/2004 | Albert et al. |
| 6,825,970 B1 | 11/2004 | Goenaga et al. |
| 6,831,769 B1 | 12/2004 | Holman et al. |
| 6,839,158 B1 | 1/2005 | Albert et al. |
| 6,842,167 B1 | 1/2005 | Albert et al. |
| 6,842,279 B1 | 1/2005 | Amundson |
| 6,842,657 B1 | 1/2005 | Drzaic et al. |
| 6,864,875 B1 | 3/2005 | Drzaic et al. |
| 6,865,010 B1 | 3/2005 | Duthaler et al. |
| 6,866,760 B1 | 3/2005 | Paolini Jr. et al. |
| 6,870,657 B1 | 3/2005 | Fitzmaurice et al. |
| 6,870,661 B1 | 3/2005 | Pullen et al. |
| 6,897,855 B1 | 5/2005 | Matthies et al. |
| 6,900,851 B1 | 5/2005 | Morrison et al. |
| 6,922,276 B1 | 7/2005 | Zhang et al. |
| 6,924,781 B1 | 8/2005 | Gelbman |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0167500 A1 | 11/2002 | Gelbman |
| 2002/0180687 A1 | 12/2002 | Webber |
| 2003/0011560 A1 | 1/2003 | Albert et al. |
| 2003/0020844 A1 | 1/2003 | Albert et al. |
| 2003/0102858 A1 | 6/2003 | Jacobson et al. |
| 2003/0132908 A1 | 7/2003 | Herb et al. |
| 2003/0137521 A1 | 7/2003 | Zehner et al. |
| 2003/0151702 A1 | 8/2003 | Morrison et al. |
| 2003/0214695 A1 | 11/2003 | Abramson et al. |
| 2003/0222315 A1 | 12/2003 | Amundson et al. |
| 2004/0012839 A1 | 1/2004 | Cao et al. |
| 2004/0014265 A1 | 1/2004 | Kazlas et al. |
| 2004/0027327 A1 | 2/2004 | LeCain et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0136048 A1 | 7/2004 | Arango et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0226820 A1 | 11/2004 | Webber et al. |
| 2004/0239614 A1 | 12/2004 | Amundson et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0000813 A1 | 1/2005 | Pullen et al. |
| 2005/0001810 A1 | 1/2005 | Yakushiji et al.. |
| 2005/0001812 A1 | 1/2005 | Amundson et al. |
| 2005/0007336 A1 | 1/2005 | Albert et al. |
| 2005/0007653 A1 | 1/2005 | Honeyman et al. |
| 2005/0012980 A1 | 1/2005 | Wilcox et al. |
| 2005/0017944 A1 | 1/2005 | Albert |
| 2005/0018273 A1 | 1/2005 | Honeyman et al. |
| 2005/0024353 A1 | 2/2005 | Amundson et al. |
| 2005/0035941 A1 | 2/2005 | Albert et al. |
| 2005/0041004 A1 | 2/2005 | Gates et al. |
| 2005/0062714 A1 | 3/2005 | Zehner et al. |
| 2005/0067656 A1 | 3/2005 | Denis et al. |
| 2005/0078099 A1 | 4/2005 | Amundson et al. |
| 2005/0099672 A1 | 5/2005 | Jacobson et al. |
| 2005/0105159 A1 | 5/2005 | Paolini, Jr. et al. |
| 2005/0122563 A1 | 6/2005 | Honeyman et al. |
| 2005/0151709 A1 | 7/2005 | Jacobson et al. |
| 2005/0168799 A1 | 8/2005 | Whitesides et al. |

FOREIGN PATENT DOCUMENTS

| | | |
|---|---|---|
| EP | 1 145 072 B1 | 5/2003 |
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 536 271 | 6/2005 |
| JP | 59-098227 A | 6/1984 |
| JP | 64-086116 | 3/1989 |
| JP | 64-086118 | 3/1989 |
| JP | 03-118196 A | 5/1991 |
| JP | 11-202804 A | 7/1999 |
| WO | WO 92/09061 | 5/1992 |
| WO | WO 99/41728 | 8/1999 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 03/107315 | 12/2003 |
| WO | WO 2004/001498 | 12/2003 |
| WO | WO 2004/008239 | 1/2004 |
| WO | WO 2004/055586 | 7/2004 |
| WO | WO 2004/059379 | 7/2004 |
| WO | WO 2004/077140 | 9/2004 |
| WO | WO 2004/079442 | 9/2004 |
| WO | WO 2004/090626 | 10/2004 |

OTHER PUBLICATIONS

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrphoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Chiang, A., et al., "A Stylus Writable Electrophoretic Display Device", SID 79 Digest (1979), 44.

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P. et al., "Card-size Active-matrix Electronic Ink Display", Eurodisplay 2002, 259 (2002).

Kazlas, P., et al., "12.1″ SVGA Microencapsulated Electrophoretic Active Matrix Display for Information Appliances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al.,"A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Shiwa, S., et al., "Electrophoretic Display Method Using Ionographic Technology," SID 88 Digest (1988), p. 61.

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Yang, K.H., "The investigation of image formation in a large-area solid state x-ray receptor with electrophoretic display", J. Appl. Phys., 54, 4711 (1983).

Zehner, R. et al., "Drive Waveforms for Active Matrix Electrophoretic Displays", SID 03 Digest, 842 (2003).

Ziemelis, K., "Putting it on Plastic", Nature, vol. 393, pp. 619 (1998).

* cited by examiner

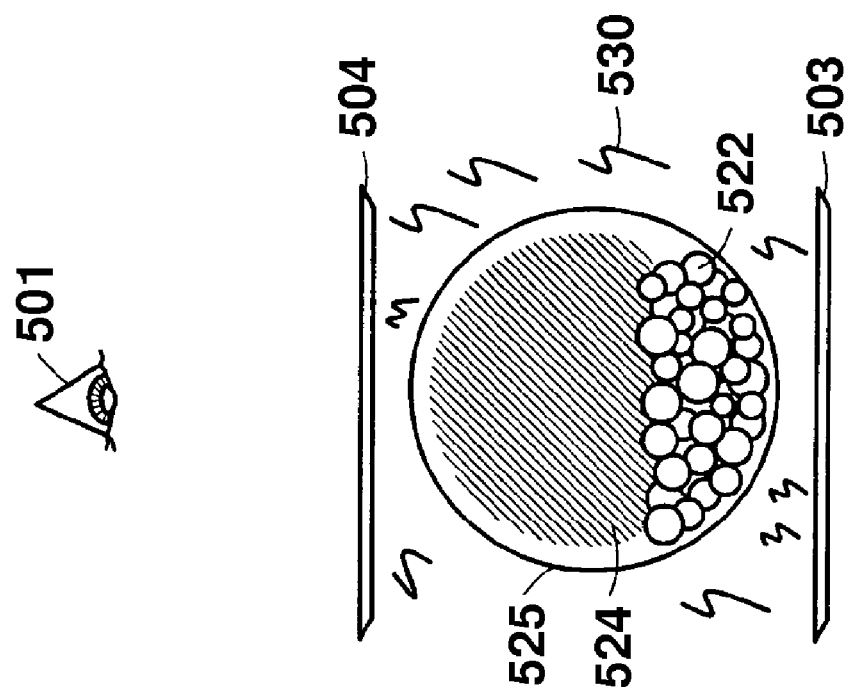
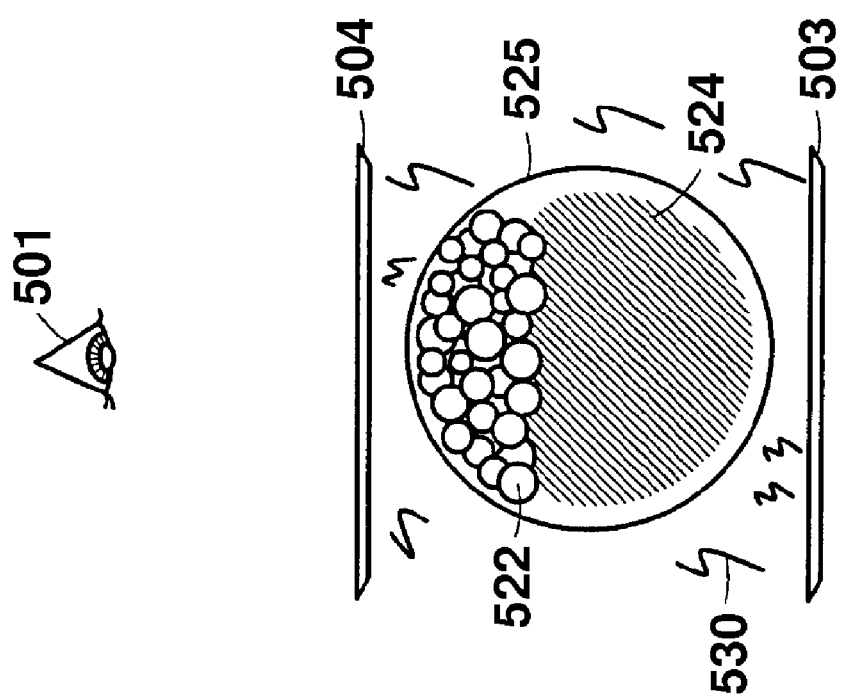

MACHINE-READABLE DISPLAYS

REFERENCE TO RELATED APPLICATIONS

This application is a continuation-in-part of application Ser. No. 09/564,043, filed May 3, 2000, now abandoned which in turn claims benefit of Application Ser. No. 60/132,178, filed May 3, 1999.

This application also claims benefit of Application Ser. No. 60/481,576, filed Oct. 29, 2003.

This application is also related to application Ser. No. 10/232,481, filed Aug. 20, 2002, now U.S. Pat. No. 6,704,133.

The entire contents of the aforementioned applications are herein incorporated by reference. The entire contents of all United States Patents and published and copending Applications mentioned below are also herein incorporated by reference.

BACKGROUND OF THE INVENTION

The present invention relates to machine-readable displays, that is to say display primarily intended to be read by machine although the displays may also be capable of being read by humans. More specifically, this invention relates to machine-readable displays which can display a bar code or similar machine-readable image based upon stored information or external inputs. The present displays may be useful in various information display applications, and in particular for the display of information concerning goods in a retail or similar environment. The present invention is especially, though not exclusively, intended for use in displays containing encapsulated electrophoretic media.

In the displays of the present invention, the electro-optic medium will typically be a solid (such displays may hereinafter for convenience be referred to as "solid electro-optic displays"), in the sense that the electro-optic medium has solid external surfaces, although the medium may, and often does, have internal liquid- or gas-filled spaces. Thus, the term "solid electro-optic displays" includes encapsulated electrophoretic displays, encapsulated liquid crystal displays, and other types of displays discussed below.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,0716,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. patent application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", TDW Japan, 2001, Paper HCS1-1 and Yamaguchi, Y, et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; and 6,753,999; and U.S. Patent Applications Publication Nos. 2002/0019081; 2002/0021270; 2002/0060321; 2002/0063661; 2002/0090980; 2002/0113770; 2002/0130832; 2002/0131147; 2002/0171910; 2002/0180687; 2002/0180688; 2002/0185378; 2003/0011560; 2003/0020844; 2003/0025855; 2003/0038755; 2003/0053189; 2003/0102858; 2003/0132908; 2003/0137521; 2003/0137717; 2003/0151702; 2003/0214695; 2003/0214697; 2003/0222315; 2004/0008398; 2004/0012839; 2004/0014265; 2004/0027327; 2004/0075634; 2004/0094422; 2004/0105036; 2004/0112750; and 2004/0119681; and International Applications Publication Nos. WO 99/67678; WO 00/05704; WO 00/38000; WO 00/38001; WO 00/36560; WO 00/67110; WO 00/67327; WO 01/07961; WO 01/08241; WO 03/107,315; WO 2004/023195; and WO 2004/049045.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; inkjet printing processes; and other similar techniques.) Thus, the resulting display can be flexible. Further, because the display medium can be printed (using a variety of methods), the display itself can be made inexpensively.

For many applications, the ability for two electronic devices to interchange information is very important. While there are many methods available, including both hardwired and wireless methods, for example infra-red ports, Bluetooth, IEEE 802.11, Ethernet, all these methods share three drawbacks; they are expensive to implement, they require fairly large amounts of power, and including capabilities for these methods in a device will increase its size and weight. This last drawback can be a major problem in small portable devices such as personal digital assistants (PDA's), shelf tags or inventory/shipping labels.

One possible solution to these problems is to use a device's display as the output device for humans and machine reading. There are precedents for this kind of dual-use display; for example, Timex (Registered Trade Mark) makes a watch which can receive data from a computer by reading with a built-in photodetector a series of flashing patterns displayed on a cathode ray tube. Also, printed bar codes on labels can be read using a laser or LED scanner. If a rewriteable display material could display bar codes readable by standard equipment, the equipment would work with both paper labels and electronic labels.

Not all display materials can be used in this application. As illustrated in FIG. 1 of the accompanying drawings, which is a schematic side elevation of a bar code reader reading a bar code, the display material must meet certain requirements. FIG. 1 shows a substrate 100 bearing bar code markings 102 (a one-dimensional bar code is illustrated, but obviously a two-dimensional bar code could be used if desired) being read by a bar code reading head 104. The head 104 emits a scanning beam 106 which is reflected from the bar code markings 102 and detected by a photodetector (not shown) in the head 104 to effect readings of these markings. Since the head 104 reads the bar code markings 102 by measuring the reflected light from their surfaces using a laser or LED, any display material used to provide markings 102 must be reflective. Furthermore, since as illustrated in FIG. 1, the beam 104 is reflected back to the head 104 over a wide range of incident angles, any display material used must have nearly Lambertian reflective qualities. Finally, the display must have sufficient brightness to give a strong return signal, and sufficient contrast to differentiate between black and white bars.

The present invention provides a display which can be used to provide bar code markings readable by a bar code scanner.

The display of the present invention may be useful in, inter alia, retail stores. Modern retailing is under rising pressure to increase both the speed and accuracy with which it displays product information and price. The almost universal use of bar codes to identify both product type and price has enabled retailers to update the price of products from a central location and have that price automatically register when the bar code is scanned at the point-of-sale (POS). However, the speed with which retailers can update product information and price at the actual location where a product is displayed has not kept pace. The delay in updating product information and pricing at the point-of-display (POD) can lead to a mismatch between the price a consumer has been lead to believe a product costs and the price registered at the POS. A consumer confronted with a different price at the POS is understandably annoyed, and adverse business or regulatory consequences may follow for the retailer.

The delay in updating product information and price at the POD most frequently arises from the need to manually update this information. Today, retail establishments typically display product information and price on labels in the form of adhesive tags, preprinted cards or plastic numbers. The label is usually affixed to the edge of the shelf or surface on which the product is located. These labels must necessarily be changed manually; a time consuming and labor intensive process subject to a variety of human errors. The cost and chance for error associated with such manual change is compounded by the rapid change of product information and price, as well as location, in the modern retail establishment. The increasing use of such dynamic pricing schemes such as yield management pricing can only increase the probability of POD and POS price mismatch.

A need therefore exists in the retail environment to replace a large majority of the manual activity in the change cycle of POD product information and price with an electronic method that is inexpensive and flexible enough to be economically viable.

Electronic shelf price label (ESPL) systems have been proposed for displaying at the POD continuously updateable prices. Electronic display units for an ESPL system have been developed which can be affixed to the edge of the shelf, and which optically indicate the price of the merchandise and perhaps additional information. The electronic display units are connected to a store computer which can easily update the price on the electronic display unit as well as at the POS. As a result, it can generally be guaranteed that the price at the POD is the same as the price which will be charged at the POS.

Several important technical problems have prevented the cost effective development of ESPL display systems. Invariably, these systems required a near continuous supply of power, either by line transmission, battery, capacitor, RF transmission, or other form of indirect power transmission. Many systems, to date, involve a hard-wired connection from the individual electronic display units to the power supply. The expense associated with installing and maintaining such hard-wire systems has hindered their economic viability. In addition, the goods on the shelves in most retail establishments are constantly being rearranged. Consequently any direct hard-wired system becomes an expensive impracticality. Wireless power transmission systems have been proposed where the electronic display units inductively receive the energy emitted by a transmitter to recharge an integrated or hardwired power source, e.g., a battery. Nevertheless, these systems also invariably require a near constant supply of power to maintain the display of the electronic display units.

To date, a major cost driver of ESPL systems has been the electronic display unit and associated communication electronics. In a traditional ESPL system, there is one wired emissive electronic display unit affixed to the shelf for each SKU. Due to the expense of a high-contrast, high-resolution emissive electronic display, only the price portion of the label is variable; the rest of the label, such as the bar code and SKU information, is printed and permanent. As a result, manual labor is required to move the electronic display units whenever the corresponding product is moved.

The benefits flowing from installation of a viable, workable ESPL system would be many. Prices could be displayed at the POD for each of the many products for sale, and the price, electronically displayed, could be made to match with high reliability the price registered when the product is scanned at the POS. Sales and "specials" could be posted, and later cleared, with a minimal labor cost as compared to the common manual method of updating POD information. Further, a viable, workable ESPL system that provides an electronic display with the mechanical compatibility of a printed display could truly satisfy the needs of the retail environment. Such a system, could almost instantaneously, and store wide, update each and every POD display unit, and quite possibly enable in-store marketing methods never before thought possible.

SUMMARY OF THE INVENTION

In one aspect, this invention provides a reflective electro-optic display having a bar code display area arranged to display a bar code readiable by a bar code scanner.

The display of the present invention may have a visual message display area separate from the bar code display area and arranged to display at least one indicium selected from the group consisting of alphanumeric characters and graphics. The message display area is intended to be read by a human operator and may or may not repeat the data encoded in the bar code display area. The message display area may display fixed and/or variable information, but it is generally desirable that it make some provision for the display of variable information.

In the present display, the bar code display area may be arranged to display a one-dimensional or two-dimensional bar code. When the bar code to be displayed is one-dimensional, the bar code display area may be provided with a plurality of parallel elongate electrodes and drive means for applying to the elongate electrodes differing voltages, thereby causing the electro-optic display to display the bar code. Alternatively, the display may have a writing means movable linearly relative to the bar code display area, the writing means having at least one electrode capable of writing on the bar code display area. Such a writing means may have a plurality of electrodes and means for varying the voltages applied to the electrodes as the writing means is moved relative to the bar code display area, so that the writing means writes a two-dimensional bar code on the bar code display area.

The display of the present invention may have input means for receiving data from a source external to the display or from a sensor, and for varying at least one area of the display dependent upon the data. The display may also comprise a sensor arranged to supply data to the input means; such a sensor may be, for example, a shock sensor, a temperature sensor or a timer. The display may also comprise a power source or a pick-up coil arranged for inductive coupling to an external power source.

The display of the present invention may make use of any of the various types of electro-optic media discussed above. Thus, for example, the display may comprise a rotating bichromal member or electrochromic electro-optic medium. Alternatively, the display may comprise an electrophoretic electro-optic medium, the electrophoretic medium comprising a plurality of electrically charged particles suspended in a suspending fluid and capable of moving through the suspending fluid on application of an electrical field thereto. The electrically charged particles and the suspending fluid may be confined within a plurality of capsules or microcells. The suspending fluid may be a liquid or a gas.

This invention also provides an apparatus for the display of goods, this apparatus comprising a surface for supporting the goods, and an electro-optic display of the present invention disposed adjacent this surface. The surface for supporting the goods may comprise a shelf, the shelf having an extension forming a channel arranged to receive the electro-optic display. Conveniently, the electro-optic display is made flexible so that it can be bent for insertion into the channel. In this apparatus, the electro-optic display may make use of any of the various types of electro-optic media discussed above.

In another aspect, this invention provides a package comprising a container, goods confined within the container and capable of being rendered unsuitable for use due to occurrence of a condition, and an electro-optic display affixed to the container and arranged to indicate when the condition has occurred. In such a package, the condition may be, for example, any one or more of exposure of the container to a mechanical shock, exposure of the container to a temperature or humidity outside a predetermined range, and the goods remaining within the container past an expiration date.

This invention also provides a device for the electronic display of information on a storage surface comprising:
(a) a goods storage surface, wherein said goods storage surface comprises:
(i) a portion for supporting goods; and
(ii) an extension for displaying information; and
(b) an updatable electrophoretic display unit proximately disposed on said extension, wherein said electrophoretic display unit comprises:
(i) a bistable encapsulated electrophoretic display medium, and
(ii) a first electrode disposed adjacent said electrophoretic display medium,
wherein said display state changes in response to an electrical signal communicated to said first electrode.

Finally, this invention provides a device for the electronic display of information on a storage surface comprising:
(a) a goods storage surface, wherein said goods storage surface comprises:
(i) a portion for supporting goods; and
(ii) an extension for displaying information;
(b) an updatable electrophoretic display unit proximately disposed on said extension, wherein said electrophoretic display unit comprises:
(i) a flexible and bistable encapsulated electrophoretic display medium printable on said extension, and
(ii) a first electrode disposed adjacent said electrophoretic display medium,
wherein an optical display state of said display state changes in response to an electrical signal communicated to said first electrode, and then remains substantially unchanged over a required viewing time upon removal of said electrical signal.

BRIEF DESCRIPTION OF THE DRAWINGS

As already indicated, FIG. 1 of the accompanying drawings is a schematic side elevation of a bar code reader reading a bar code.

FIGS. 6A and 6B illustrate the manner in which the electrophoretic media of FIGS. 5A–5G change optical display states.

DETAILED DESCRIPTION

Figure 1:
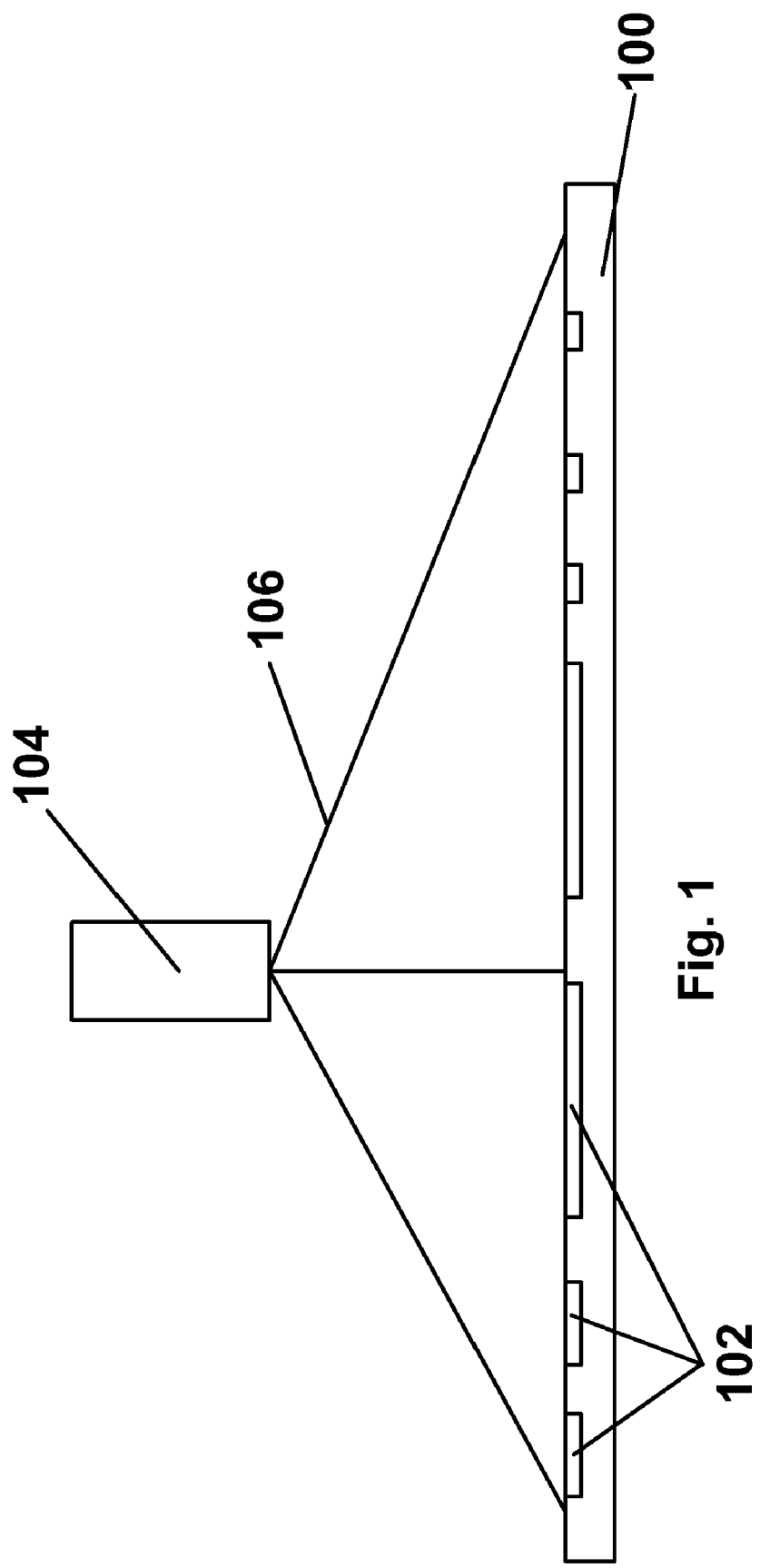

As already mentioned, in one aspect this invention provides a reflective electro-optic display having a bar code display area arranged to display a bar code readable by a bar code scanner. As discussed above with reference to FIG. 1, a bar code reader emits a scanning beam which is reflected from the bar code markings and detected by a photodetector. Since the bar code reader relies upon reflection of the scanning beam, the electro-optic display should use an electro-optic medium which is reflective rather than transmissive. The electro-optic medium need not be reflective in both its extreme optical states (typically black and white); for example, the electro-optic medium could be of the shutter mode type, with one white, reflective optical state and a substantially transparent optical state which could appear or be made to appear black to the reader (for example, by providing a black backing on the bar code display area. Also, since as already explained the bar code reader reads a bar code at a wide range of angles, the electro-optic medium should be one which is viewable over a wide range of angles, i.e., which has Lambertian or near-Lambertian reflectance.

The electro-optic display of the present invention may contain display areas other than the bar code display area. For example, it may convenient to provide a message area which contains a human-readable version of the data encoded in the bar code. The display may also display information for promotional purposes, for example an area flashing "REDUCED PRICE" or "SPECIAL". As discussed below with reference to FIGS. 2 and 3, in a display containing multiple display areas, each display area may display different information and/or may be addressed using a different addressing technique (which could be direct drive, active matrix, or electrostatic; all these forms of updating are discussed in the E Ink and MIT patents and applications mentioned above) and/or different resolution. The information shown on the various image areas may be based upon stored information and/or external inputs.

Figure 2:
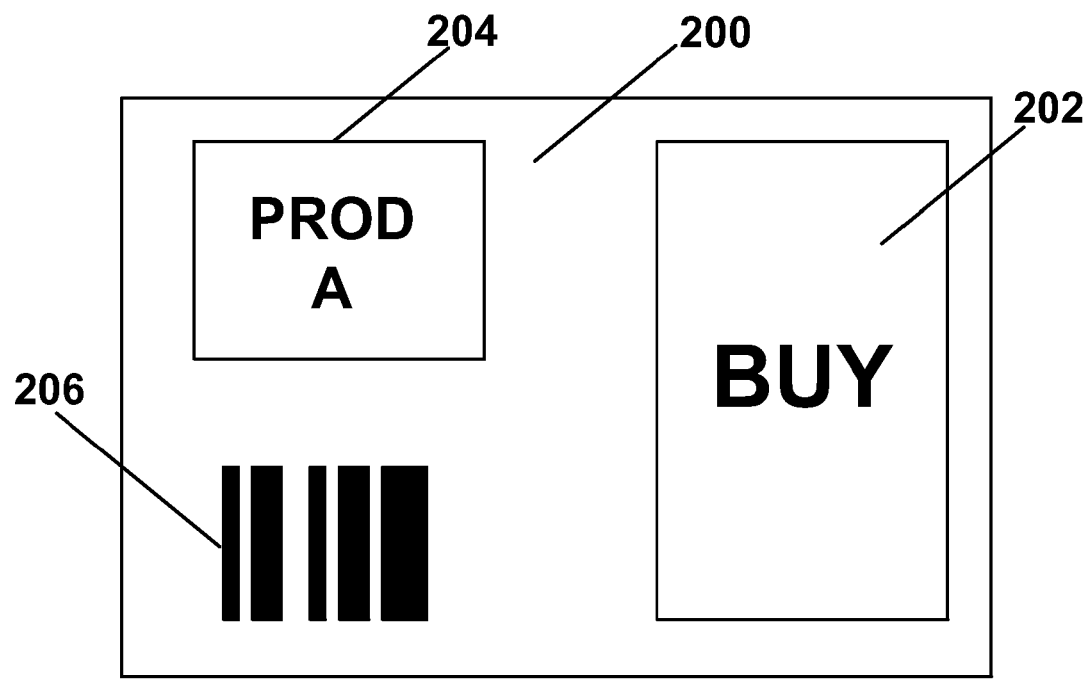
FIG. 2 is a top plan view of an electro-optic display of the present invention in the form of a shelf tag for use in a retail store.
Figure 3:
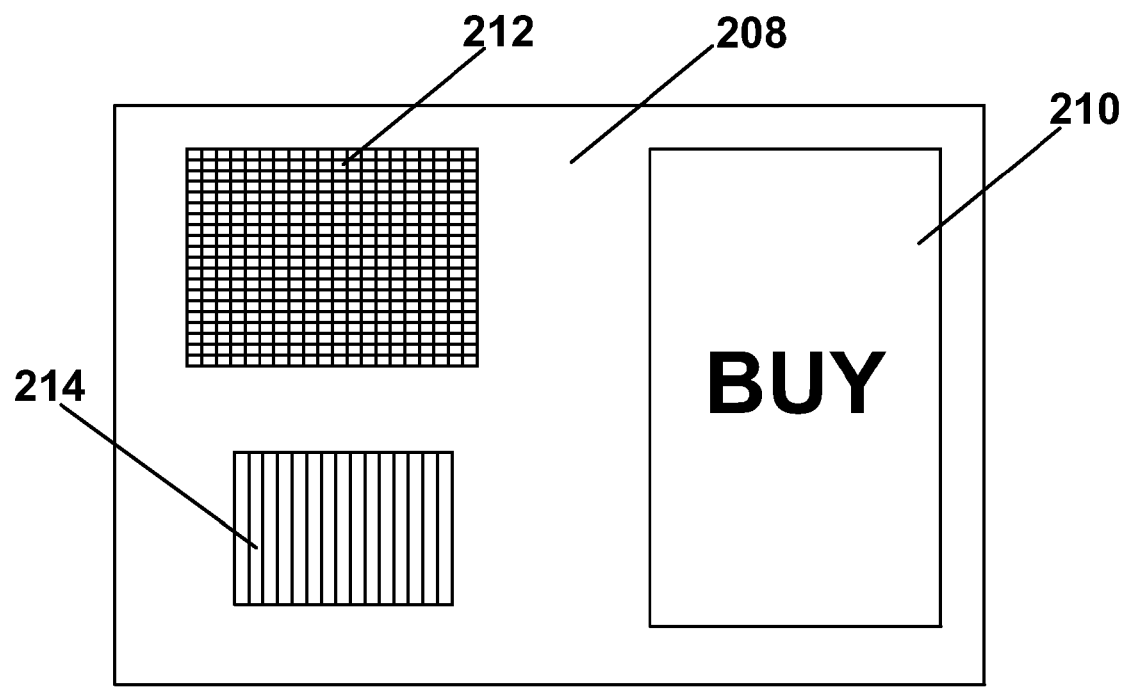
FIG. 3 is a top plan view of the backplane of the display shown in FIG. 2.

FIGS. 2 and 3 of the accompanying drawings illustrate an electro-optic display of the present invention in the form of a shelf tag (generally designated 200) intended for use in a retail store; FIG. 2 is a "top plan view" of the tag itself (as it would normally be seen by a customer passing a shelf or display cabinet to which the tag is affixed), while FIG. 3 shows a corresponding view of the backplane of the display in order to show how the various information display areas of the display are driven.

The shelf tag 200 comprises a fixed message area 202, which is arranged to flash but which can display only a single message, here the single word "BUY". The shelf tag 200 further comprises a variable message area 204, which may or may not flash, but which can display any desired alphanumeric characters, or graphics (and thus, for example can display the name of a product which it is desired to promote). Finally, the shelf tag 200 comprises a bar code display area 206. On comparing FIG. 2 with its backplane (generally designated 208) shown in FIG. 3, it will be seen that the fixed message area 202 is driven by a low cost direct drive set of electrodes 210, the variable message area 204 is driven by a thin film transistor array 212, and the bar code area 206 is driven by a series of direct drive segments 214, in the form of a series of parallel elongate electrodes. The following description concentrates on the portion of the tag 200 that contains the machine-readable information, such as the bar code display area 206 in FIG. 2, since the other areas of the tag 200 are essentially identical to the prior art displays described in the aforementioned E Ink and MIT patents and applications. By "machine-readable information" is meant any of the family of optical encoding schemes consisting of parallel dark lines and white spaces, referred to as bar codes, for example UPC markings.

In one form of the present invention, as illustrated in FIG. 3, the rear electrode in the machine-readable (bar code display) region may be patterned to provide for a series of electrically isolated, parallel lines or electrodes, typically running from bottom to top of the display. Each of these electrodes is connected to an output of a display driver. In order to produce a bar code, each line can be addressed to either the dark or white state by applying the appropriate voltage.

In another form of the present invention, the bar code display area may be addressed electrostatically by external electrodes; see, for example, U.S. Pat. No. 6,473,072. The bar code display area may be moved linearly relative to a linear array of evenly spaced addressing electrodes which are kept at the appropriate voltage, to generate a bar code pattern on the bar code display area. In a slight modification of this display, the voltages on the addressing electrodes are varied as the display is moved relative to the electrodes to yield a two-dimensional bar code.

In a third form of the present invention, the bar code display area may be driven by an active matrix, direct drive or passive matrix backplane that is capable of addressing an array of pixels, which are typically square although other similar shapes can be used.

The data displayed on the bar code display area of the present display is of course not confined to UPC codes for goods, and may represent user input, information extracted from a database or information derived from a sensor or timer. For example, the information may be derived from a temperature or humidity sensor, a timer (measuring either actual time or time elapsed from some predetermined starting point), a motion sensor or a sensor which determines mechanical shock (technically an accelerometer). Thus, a display of the present invention may be used on a container for goods to indicate the occurrence of a condition which might render the goods unsuitable for use, or at least suggest a need for inspection of the goods before they are used. For example, the bar code on a package shipped via a courier service could change to indicate that the package had been dropped or subjected to other severe mechanical stress, or subjected to variations in temperature and/or humidity which might affect the goods in the package. In the case of a food container, a bar code could be changed to indicate when goods are past their expiration date. The bar code (and perhaps a human-readable portion of the display) could change multiple times; for example, in the case of a food or photographic film container, the bar code could change to indicate a lower price when the food or film approaches its expiration date, and undergo a second change at the expiration date to indicate that the product could no longer be sold.

Timers which indicate the actual time may be useful where signs are to vary with the time of day, day of the week etc. For example, the UPC code on a product in a retail store, or a menu outside a restaurant could change twice daily to allow for differing prices by day or by night, or differing prices and/or selections for lunch and dinner.

The displays of the present invention may be powered by an internal power source (such as a battery, fuel cell, thermistor or thermo-electric device). They may also be powered by inductive coupling to an applied AC field, through an included pick-up coil. Displays intended to indicate mechanical shock they may also be powered by a piezoelectric element.

Display materials suitable for use in the present invention include all the types of electro-optic medium discussed below, and media based upon the electro-deposition of metallic films.

As already indicated, the present invention also provides devices for the electronic display of storage information on a storage surface. In this aspect, the invention seeks to provide an electronic display unit for an ESPL system that is flexible and which requires substantially no power to maintain the display of the electronic display unit. In addition, the electronic display unit of the present invention may feature a printable electronic display comprising an encapsulated electrophoretic display medium. The resulting electronic display is flexible and has in large measure the applications of a printed display.

The encapsulated electrophoretic display medium which can be used in the present invention is an opto-electronically active material which comprises at least two phases: an electrophoretic contrast media phase and a coating/binding phase. The electrophoretic display medium can form, for example, a full color, multi-color, or two color (e.g. black and white) display. The electrophoretic phase may comprise at least one species of encapsulated electrophoretic particles, having distinct physical and electrical characteristics, dispersed in a clear or dyed suspending fluid. The coating/binding phase includes, in one embodiment, a polymer matrix that surrounds the electrophoretic phase. In this embodiment, the polymer in the polymeric binder is capable of being dried, cross-linked, or otherwise cured as in traditional inks, and therefore a printing process can be used to deposit the encapsulated electrophoretic display medium onto a substrate. Accordingly, hereinafter the term "electronic ink" may be used to refer to the encapsulated electrophoretic display medium.

The optical quality of an electronic ink is quite distinct from other electronic display materials. The most notable difference is that electronic ink provides a high degree of both reflectance and contrast because it is pigment based (as are ordinary printing inks). The light scattered from the electronic ink comes from a very thin layer close to the top of the viewing surface. In this respect it resembles a common printed image. Thus, electronic ink is easily viewed from a wide range of viewing angles in the same manner as a printed page. Such ink approximates a Lambertian contrast curve more closely than any other electronic display material. Since electronic ink can be printed, it can be included on the same surface with any other printed material. Electronic ink can be made optically stable in all optical states, that is, the ink can be set to a persistent optical state. An electronic ink display is particularly useful in low power applications because of this stability.

Whether or not an encapsulated electrophoretic medium is bistable, and its degree of bistability, can be controlled through appropriate chemical modification of the electrophoretic particles, the suspending fluid, the capsule, and coating/binding phase. Another advantage of an encapsulated electrophoretic display is that relatively poor conductors, for example, materials with resistivities on the order of $10^3$–$10^{12}$ ohms/square, can be used as electrodes to apply an electric field to select portions of the display, i.e., address a display element.

An encapsulated electrophoretic medium may be coated on to practically any surface using appropriate binders such as PVC's, urethanes and silicone binders, allowing such displays to be: (1) made in large sizes (such as poster and billboard sizes) using coating techniques; (2) lightweight enough to install without an overhead crane; (3) flexible enough to bend with wind; and (4) capable of holding an image without further power draw, thereby operating economically from solar cells, batteries, or inductive power transmission.

There are many places in a retail environment where an encapsulated electrophoretic medium can provide a superior display. For example, such a medium can switch between various optical display states in order to communicate a condition of or information about a product. The condition or information could include, for example, whether an item is on sale or whether an item has been deactivated from an internal security system.

Encapsulated electrophoretic media are ideal for application in an electronic display unit of an ESPL system. An electronic display unit comprised of such a medium possesses several advantages for use as a POD label: (1) the display is reflective, and as a result, has a wide field of view and high contrast; (2) the display can be made thin, and as a result, it be made both light weight and flexible; (3) the display can be printed, and as a result, can potentially be made for a low cost; and (4) the display can be bistable, and as a result, it draws substantially no energy during display. For example, such an electronic display unit could be so thin as to fit within the standard channel groove provided on supermarket gondola shelving. Further, the display could be curved, either concave or convex, to provide a smooth yet attention-grabbing display. Additionally, such a display could be tilted at an angled from the vertical to provide for glare reduction, and yet still maintain a shallow enough profile to avoid interfering with removal of product from the shelves.

More importantly, the present invention provides a bistable electronic display unit, which requires substantially no power to maintain the display state, by taking advantage of the electrophoretic nature of the constituent electronic ink. As a result, the elaborate power transmission systems of prior ESPL systems are not required for the electronic display devices of the present invention. Accordingly, hereinafter the term "electrophoretic display unit" is used to refer to the electronic display unit comprised of an electronic display of the present invention.

Further, the terms "display state" and "optical display state" are used to refer to the visual appearance of the electronic display of an electrophoretic display unit. Accordingly, it is to be realized that the display state may present a visual appearance that includes, but is not limited to, such optical properties as color, reflectivity, or luminescence. Further, this visual appearance may form a "message." As used herein, the term "message" is intended to include any type of indicium such as a number, text, or an image, alone or in combination, that conveys information. The term message includes, but is not limited to, prices, letters, words, graphics, photos, logos, bar codes, and 2D bar codes. Consequently, it is to be understood that changing the message of an electrophoretic display unit entails changing the display state of the associated electrophoretic medium of the unit.

In one aspect, the invention features a device for storing goods for sale (or rent). The devices comprises a storage surface having a portion for supporting the goods and an extension for displaying information about the goods, and an electronic shelf label disposed adjacent the extension. The electronic shelf label comprises an electrophoretic display unit providing updateable information about the goods.

In one embodiment, the device for storing goods further comprises a substrate disposed adjacent the storage surface extension. The substrate comprises a strip having a plurality of segments in electrical communication with each other. At least one segment has an electrophoretic display unit displaying information about the goods. This strip may be used, for example, to highlight the shelf and draw attention to the goods thereon.

In one embodiment, the electrophoretic medium of the electrophoretic display unit is electrostatically writable. In one embodiment, the storage surface is a shelf that further comprises a track along the extension and an electrostatic print head that moves along the track and automatically updates information about the goods.

In another embodiment, the device for storing goods further comprises a sensor in communication with an information updating unit, for receiving update signals, in electrical communication with an electrophoretic display unit. The sensor can comprise a microphone. Alternatively, the sensor can comprise an optical sensor. In one embodiment, the sensor comprises a photodiode. In another embodiment, the device further comprises a logic circuit updating the information displayed by the electrophoretic display media based on data received by the sensor. In another embodiment, the device further comprises a short-range radio antenna in electrical communication with the information updating unit. In various embodiments, the short-range radio antenna is capable of receiving data from a distance of no more than about 12 inches, 10 feet, or 100 feet. It is to be realized that the desired of the radio antenna will vary with the nature of the retail environment. For example, a lumber yard could benefit from an antenna capable of receiving data from about 100 feet, whereas a corner grocery store might require an antenna capable of receiving data from only about 12 inches.

In another aspect, the invention features a method of updating information on an electronic shelf label. The method comprises the steps of: (a) providing an electrophoretic display unit comprising an electrophoretic medium disposed on a first electrode; and (b) applying an electric field across the electrophoretic medium to change the display state thereof. In one embodiment, step (a) comprises providing an electrophoretic display unit disposed on an extension of a shelf, where the shelf has a portion for supporting goods for sale and an extension for displaying information about the goods. In one detailed embodiment, step (a) further comprises providing a strip having a plurality of segments in electrical communication with each other, where at least one segment has an electrophoretic display unit disposed adjacent one surface of a segment that displays information about the goods.

In one embodiment, step (b) comprises: (b1) receiving data for updating the information displayed on the electrophoretic display unit; and (b2) applying an electric field across the electronic ink based on the received data.

In another embodiment, step (a) comprises providing a first electrophoretic display unit in electrical communication with a second electrophoretic display unit; and step (b) comprises: (b1) transmitting data through short range radio signals from the first electrophoretic display unit to the second electrophoretic display unit; and (b2) applying an electric field across the electronic ink of the second electrophoretic display unit based on the transmitted data. In one embodiment, the method further comprises the step of receiving data from a central control station at the first electrophoretic display unit and subsequently re-transmitting the data from the first electrophoretic display unit to the second electrophoretic display unit.

In another embodiment, the method further comprises the step of using a portable activation device to update the information displayed on the electrophoretic display unit. In still another embodiment, the method further comprises the step of using an electrostatic printing device to update the information displayed on a electrophoretic display unit by moving the electrostatic device along a track disposed on a shelf extension on which the electrophoretic display unit is disposed and automatically updating information displayed on the electrophoretic display.

In addition, the present invention seeks to provide a store wide product information and price display system. In one embodiment, this system comprises electronic ink signage and an ESPL system of electrophoretic display units. The resulting store wide display system permits a fully integrated system in which both electronic signage and electrophoretic display units are updateable from a single location. This system permits enhanced flexibility and adaptability in store signage while also ensuring store wide price consistency at the POD. In another embodiment, the store wide product information and price display system is further integrated with the store POS price data system. The resulting store wide display system permits a retailer to update product information and price from a single location while ensuring that the price a consumer has been lead to believe a product costs at the POD will match the price registered at the POS.

This invention focuses on the use of encapsulated electrophoretic media to achieve beneficial effects in a retail environment. However, it is to be understood that such inventions could also be applied to analogous environments, including restaurants, banks, airports, health clubs, stadiums, and so forth; in short any space open to a number of people in which transactions are conducted, without departing from the spirit and scope of the present invention.

Figure 4A:
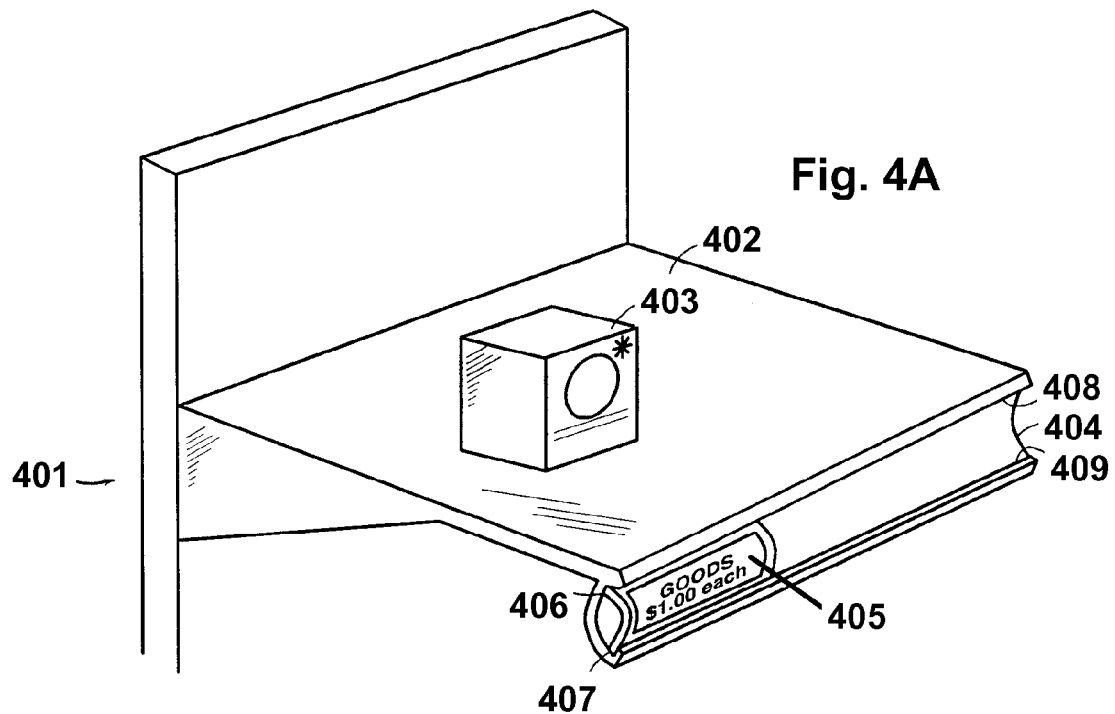
FIGS. 4A–4D illustrate various devices of the present invention for the electronic display of information on a storage surface.
Figure 4B:
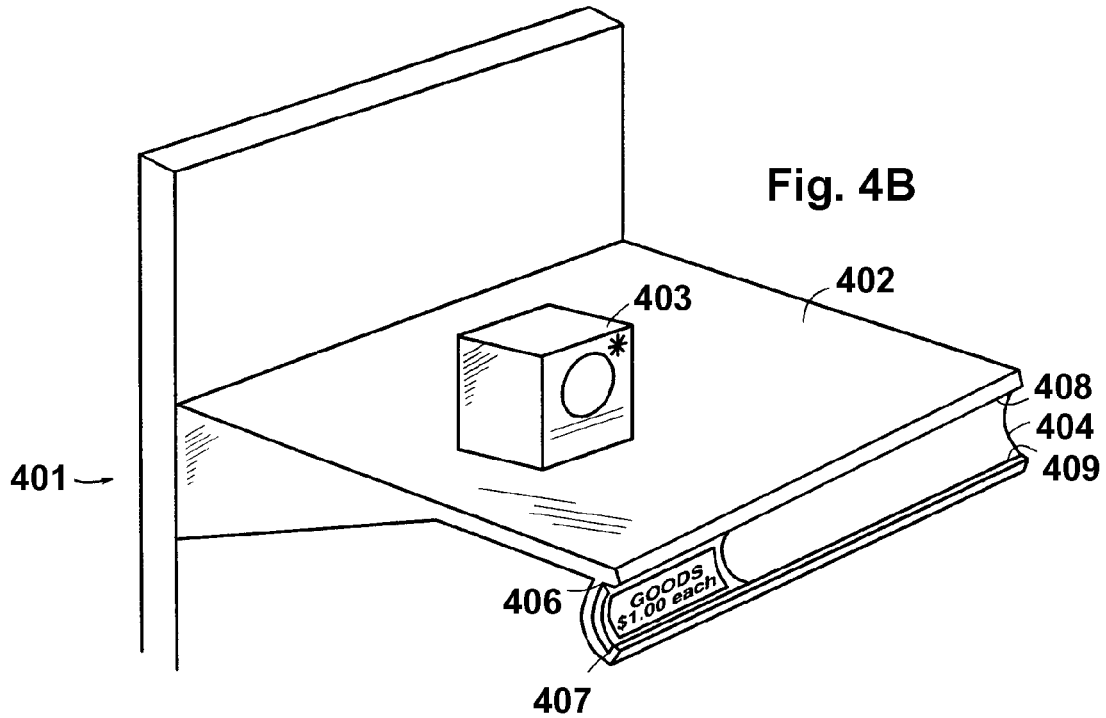
Figure 4C:
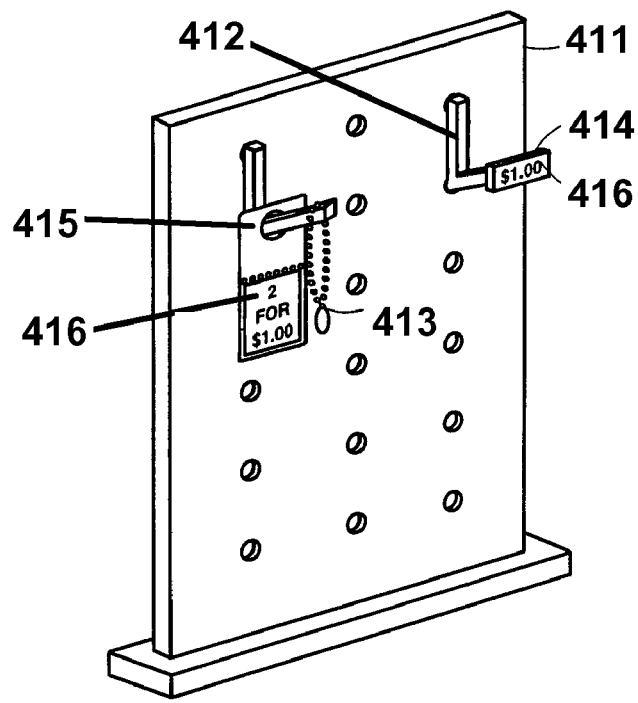
Figure 4D:
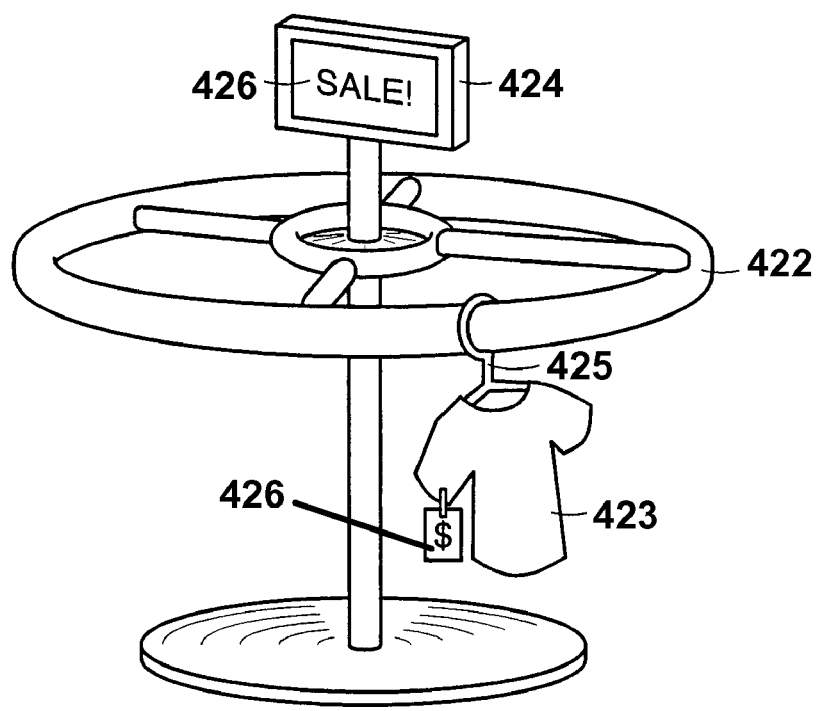

According to the present invention, a goods storage surface with a portion for supporting goods and an extension for displaying information is provided and an electrophoretic display unit is disposed on the extension. Referring to FIGS. 4A–4D, various embodiments of a device for the electronic display of information on a storage surface are illustrated. Referring to FIGS. 4A and 4B, in one embodiment, a device for the electronic display of information on a storage surface 401 comprises a shelf 402 for supporting goods 403 and an extension 404 with an electrophoretic display unit 405 disposed thereon. As illustrated, in a preferred embodiment the extension 404 comprises the standard channel groove provided on a standard gondola-type shelf 402. In this embodiment, the electrophoretic display unit 405 is disposed on the extension by flexing the display unit so that the upper and lower edges 406 and 407 of the display unit fit into the recesses 408 and 409 of the extension channel. In FIG. 4A, the display unit 405 is flexed to form a convex display. Alternatively, as illustrated in FIG. 4B, the display unit 405 is flexed to form a concave display. Referring to FIG. 4C, in another embodiment, a device for the electronic display of information on a storage surface 411 comprises pegs 412 for supporting goods 413 and various extensions 414, 415 on which are disposed an electrophoretic display unit 416. As illustrated, the rack 412 is a standard pegboard type. FIG. 4D illustrates a device for the electronic display of information on a storage surface comprising a rack 422 for supporting goods 423 and various extensions 424, 425 on which are disposed an electrophoretic display unit 426. As illustrated, the rack 422 is a standard circular clothing rack. Accordingly, it is to be understood that the present invention provides a device for the electronic display of information that can be used on any standard retail display fixture.

Figure 5A:
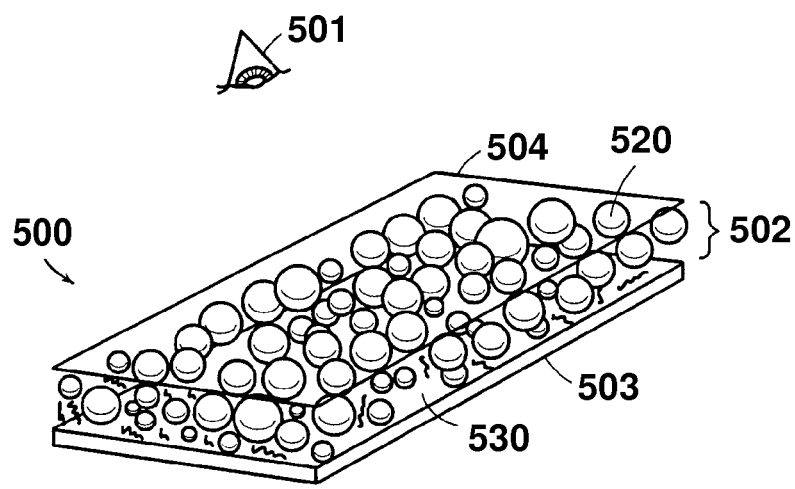
FIGS. 5A–5G illustrate various electrophoretic media which may be used in the devices of FIGS. 4A–4D.

According to the present invention, an electrophoretic display unit for an ESPL system, that can be both flexible and bistable, is provided. In a preferred embodiment, the display unit comprises an encapsulated electrophoretic medium printed on a substrate that forms a first electrode. An encapsulated electrophoretic medium is capable of being printed by several different processes, depending on the mechanical properties of the specific medium employed. For example, the fragility or viscosity of a particular medium may result in a different process selection. A very viscous medium would not be well-suited to deposition by an inkjet printing process, while a fragile medium might not be used in a knife over roll coating process. Accordingly, it is to be understood that as used throughout the specification, printing is intended to include all forms of printing and coating, including: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes;

electrostatic printing processes; thermal printing processes; ink jet printing processes; and other similar techniques. Consequently, a "printed element" refers to an element formed using any one of the above techniques. There are multiple embodiments of electrophoretic display units that provide the advantages of the present invention. In one class of embodiments, an encapsulated electrophoretic medium is disposed between a first electrode and a second electrode. FIG. 5A shows one embodiment of a flexible, bistable electrophoretic display unit. The electrophoretic display unit 500 comprises an encapsulated electrophoretic medium 502 disposed between a first electrode 503 and a transparent second electrode 504. FIG. 5A depicts an embodiment of the electrode structure described above in which the second electrode 504 is on "top" of the medium 502, that is, electrode 504 is between the viewpoint 501 and the electronic ink 502. The first electrode, the second electrode, or both, may form a pattern suitable for displaying product prices and/or information depending on how the electrodes are addressed. The first electrode 503 may be fabricated from any flexible material capable of conducting electricity such that electrodes 503, 504 may apply an electric field to the electronic ink 502. The first electrode 503, may be fabricated from either opaque and/or transparent materials. Suitable opaque electrode materials include, but are not limited to, solder paste, copper, copper-clad polyimide, graphite inks, silver inks and other metal-containing conductive inks. Since the first electrode need not be transparent, the first electrode 503 can be constructed to display a selected color or an optical property complementary to that of the electronic ink 502. The second electrode 504 may be fabricated from any transparent flexible material capable of conducting electricity such that electrodes 503, 504 may apply an electric field to the electronic ink 502. Suitable transparent electrode materials include, but are not limited to, conductive polymers such as polyanilines or polythiopenes. The electrode materials may be made soluble so that electrodes 503, 504 can be fabricated using coating techniques such as spin coating, spray coating, meniscus coating, printing techniques, forward and reverse roll coating and the like. Alternatively, electrode materials may be applied from a vapor phase, by electrolytic reaction, or deposition from a dispersed state such as spray droplets or dispersions in liquids.

Figure 5B:
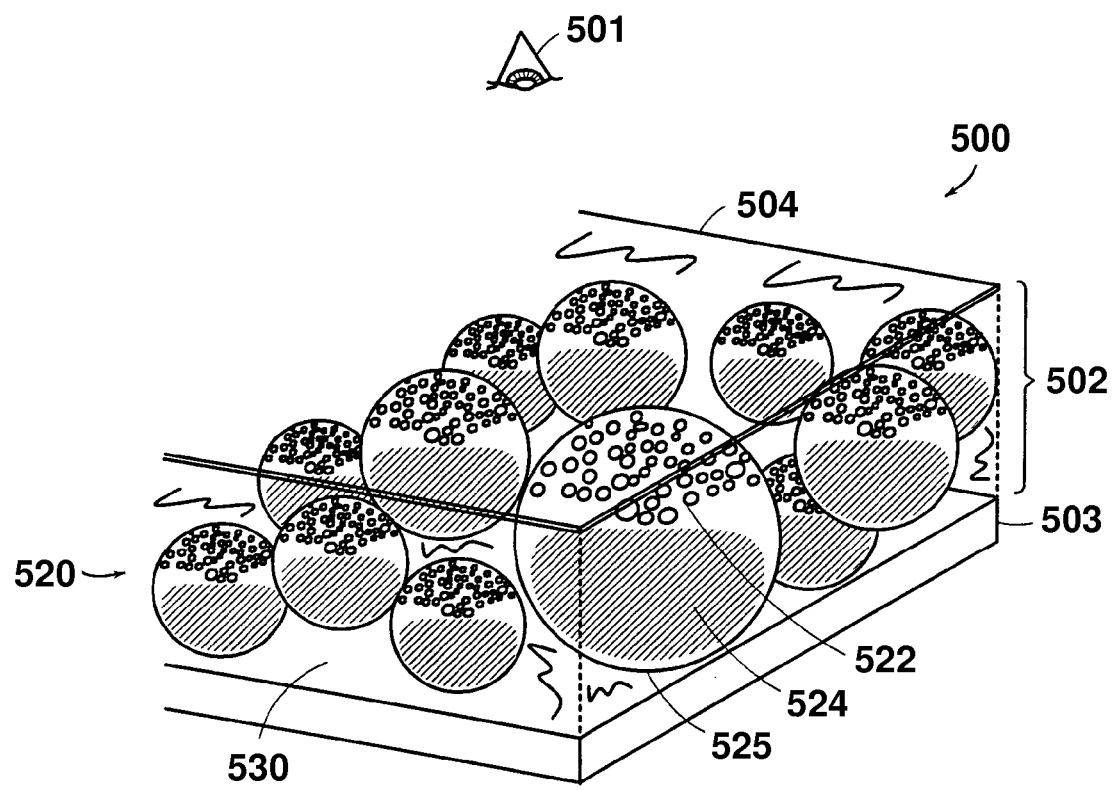

Referring again to FIG. 5A, the medium 502 comprises an opto-electrically active component 520, the "electrophoretic contrast media phase," and a binder 530, the "coating/binding phase," which holds the opto-electrically active component 520 together. The opto-electronically active component 520 is an encapsulated electrophoretic material. In FIG. 5B, the opto-electronically active component 520, comprises one or more particles 522 in a suspending fluid 524, both contained in capsules 525. The particles 522 exhibit surface charges and may be either positively or negatively charged. The particles 522 may, for example, be colored, reflective, luminescent, light-absorbing or transparent. The particles 522 may be colored any one of a number of colors. The particles 522 in a given capsule may be of a single type, or two or more different types. The particles may, for example, include neat pigments, dyed (laked) pigments or pigment/polymer composites. The capsules 525 may be of any shape and of one or more shapes. The capsules may, for example, be spherical, ellipsoidal, cubic, rectangular parallelepipedal, pyramidal, or irregularly shaped. The capsules 525 may be formed by any suitable encapsulation technique. In one embodiment, a capsule 525 comprises a membrane that encapsulates the particles 522 and fluid 524. In another embodiment, a capsule 525 comprises a void created in the binder 530 which encapsulates the particles 522 and fluid 524. Such voids are also referred to as capsules herein even though no encapsulating membrane is present. The capsules 525 may have an average diameter in the range 5 to 500 microns. In a preferred embodiment, the average diameter of the capsules 525 is in the range 50 to 300 microns. In another preferred embodiment, the capsules' average diameter is in the range of 75 to 300 microns. In a particularly preferred embodiment, the capsules 525 have an average diameter on the order of about 100 microns. Capsules this small allow significant bending of the display unit 500 without permanent deformation or rupture of the capsules themselves. The optical appearance of the medium 502 itself is more or less unaffected by the curvature of the display unit 500.

To provide a bistable display, the suspending fluid 524 may have a specific gravity substantially matched to the density of the particles 522. This provides a bistable display because the particles 522 do not tend to move within the capsule 525 absent an electric field applied via the electrodes 503, 504. As defined herein, a suspending fluid has a density that is "substantially matched" to the density of the particle if the difference in their respective densities is between about zero and about two g/ml. This difference is preferably between about zero and about 0.5 g/ml. In a preferred embodiment, the suspending fluid 524 is dyed. In other embodiments, the fluid 524 is clear, or substantially clear, so that the fluid 524 does not inhibit viewing the particles 522 or the electrodes 503, 504 from viewpoint 501. The suspending fluid 524 should have a low dielectric constant. A low dielectric constant allows an electric field to be established by electrodes 503, 504 across a capsule 525 with a minimum draw of power. In one embodiment, suspending fluid 524 comprises a single fluid. In other embodiments, the suspending fluid 524 comprises a blend of more than one fluid. Reactants or solvents for the microencapsulation process (oil soluble monomers, for example) can also be contained in the suspending fluid. Charge control agents can also be added to the suspending fluid. In one embodiment, the suspending fluid 524 contains surface modifiers to modify the surface energy or charge of the particles 522 or bounding capsule 525. A preferred suspending fluid has a low dielectric constant (about 2), high volume resistivity (about $10^{15}$ ohm-cm), low viscosity (less than 5 cst), low toxicity and environmental impact, low water solubility (less than 10 ppm), high specific gravity (greater than 1.5), a high boiling point (greater than 90° C.), and a low refractive index (less than 1.2).

The binder 530 can be selected from any suitable material. Binders are available in many forms and chemical types. Among these are water-soluble polymers, water-borne polymers, oil-soluble polymers, thermoset and thermoplastic polymers, and radiation-cured polymers. Suitable binder materials include, but are not limited to, polyurethanes, polyvinylalcohols, gelatins, polyacrylates, polystyrenes, polyvinylbutyrals, polyesters, epoxies, silicones, polycarbonates, their derivatives, and pressure-sensitive urethanes and adhesives.

Figure 5C:
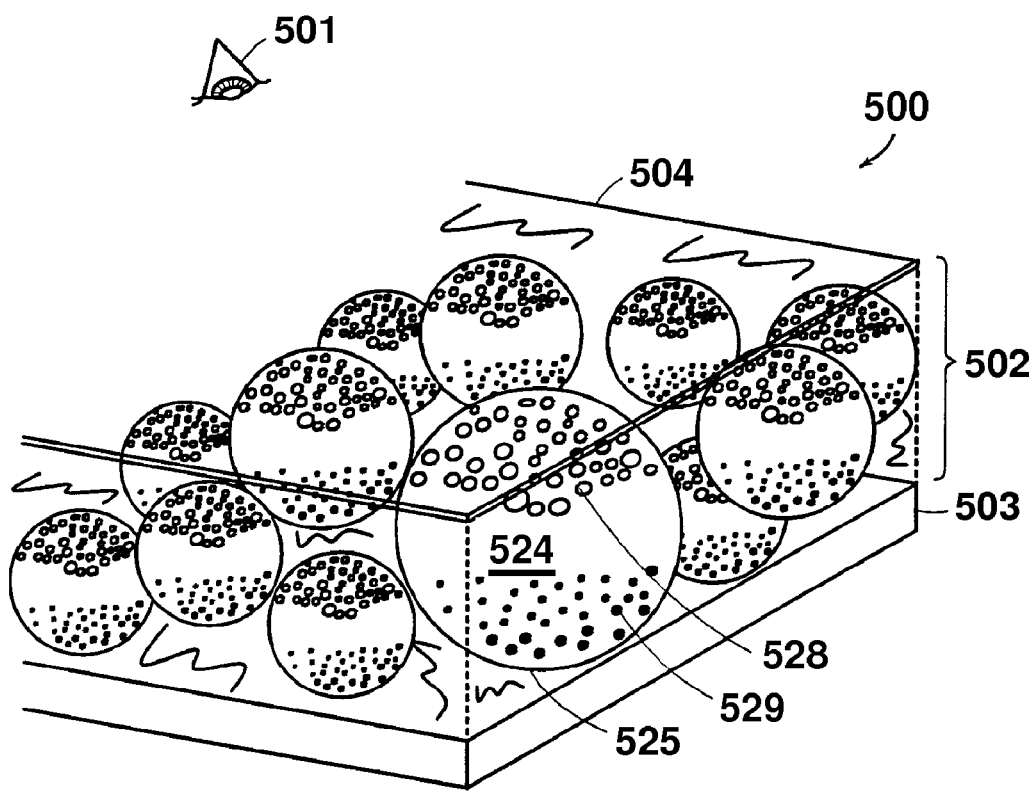

FIG. 5C shows another embodiment in which the capsules 525 contain two separate species of particles 528, 529 suspended in a clear suspending fluid, in which one species of particle absorbs light (black) 528, while the other species of particle scatters light (white) 529. In other embodiments, the capsules contain more than two species of particles, within either a clear or a dyed suspending fluid to produce multiple color or full color electrophoretic displays.

Figure 5D:
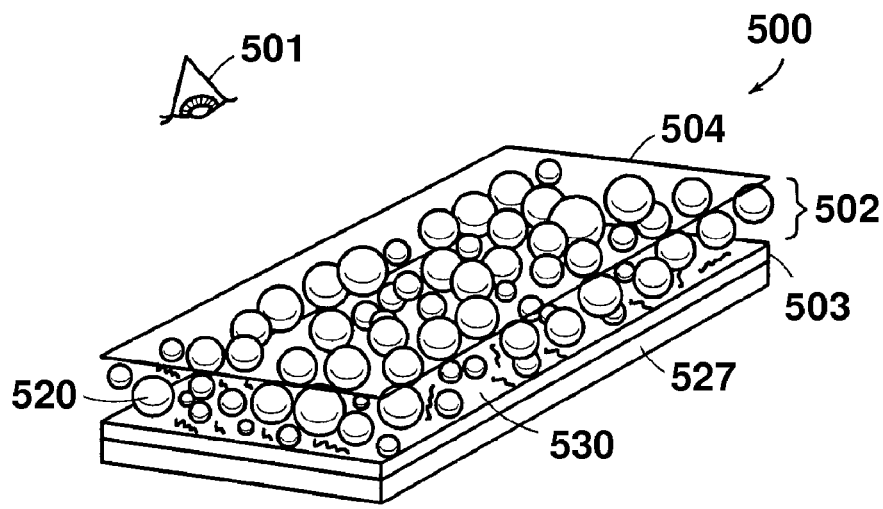
Figure 5E:
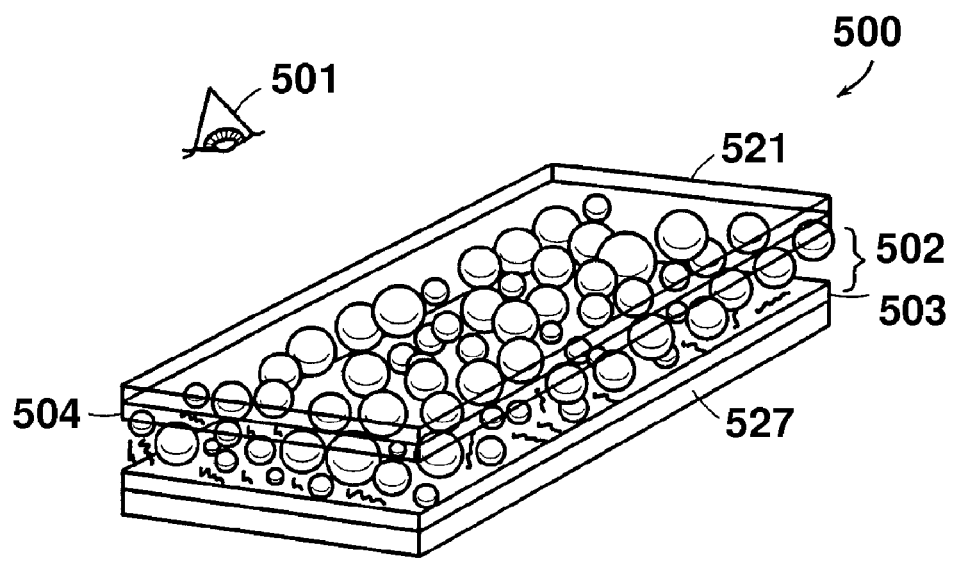
Figure 5F:
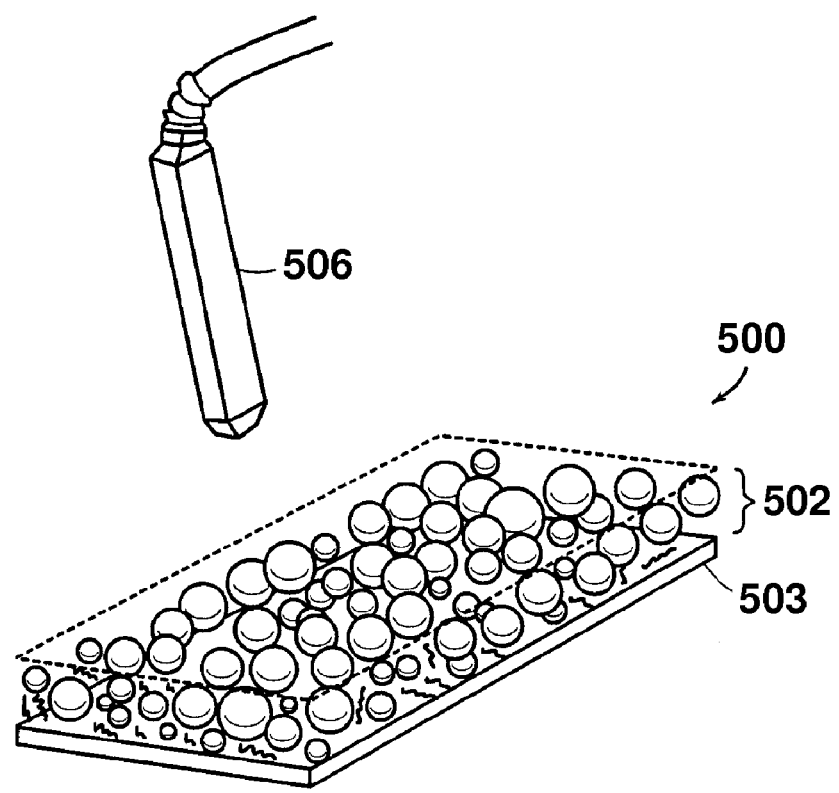
Figure 5G:
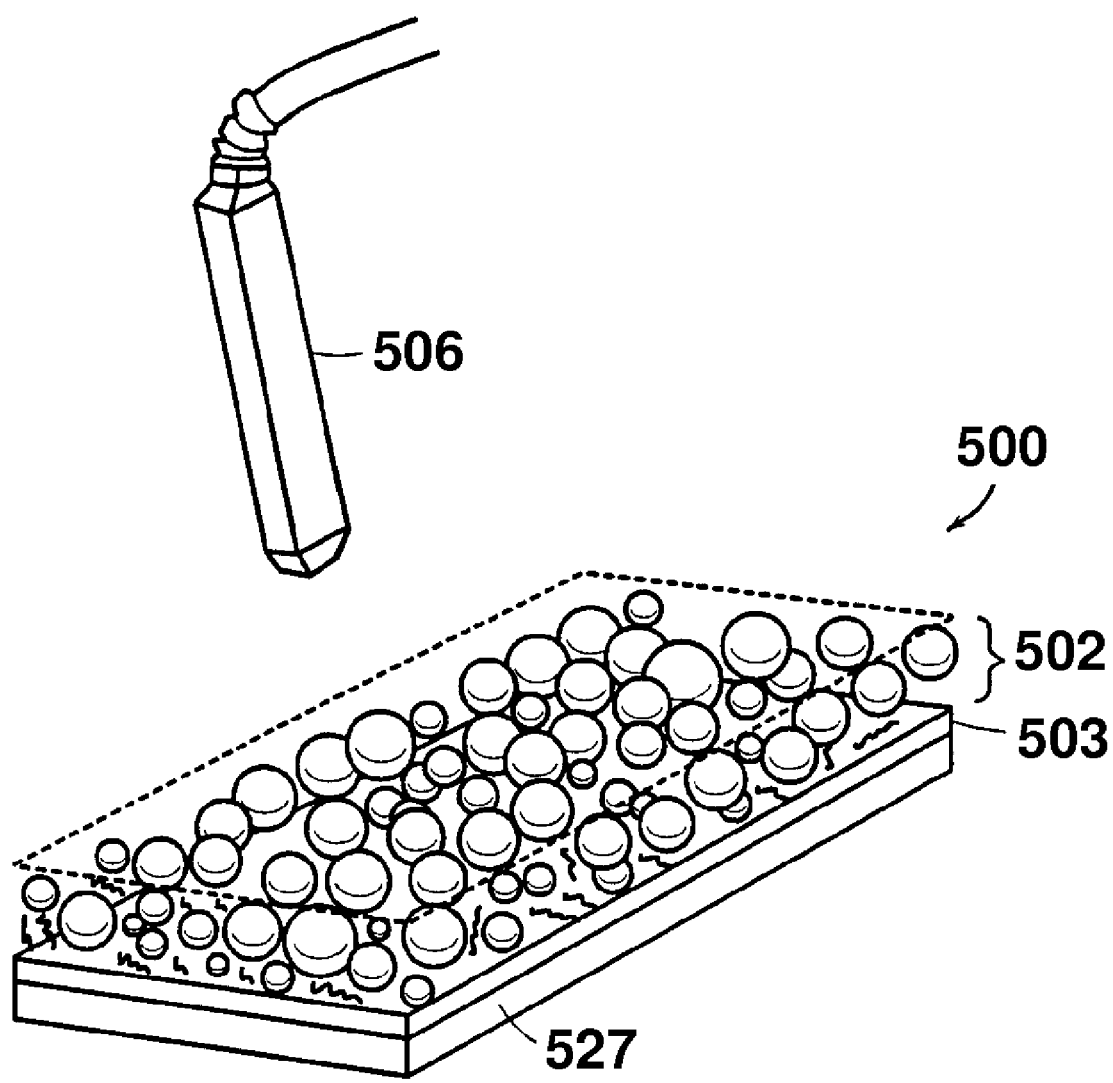

As shown in FIGS. 5D and 5E, the electrophoretic display unit 500 may further comprise a flexible substrate 527 on to which the first electrode 503 is disposed or into which it is incorporated. The electrophoretic display unit may further comprise a flexible transparent substrate 521 disposed on or incorporated with the second electrode 504. Suitable substrate materials include, but are not limited to, plastics, fabrics, paper, or synthetic paper. In another class of embodiments, an electrophoretic display unit is provided that comprises an encapsulated electrophoretic medium disposed on a first electrode and an externally provided second electrode. In FIGS. 5F and 5G the electrophoretic display unit 500 comprises an encapsulated electrophoretic medium 502 disposed on a first electrode 503. In this class of embodiments, an externally provided second electrode 506, such as, for example, an electrostatic print head or a charged stylus, applies voltage to the unit to change the display state of the display unit 500. The electrophoretic display unit 500 may further comprise a flexible substrate 527 onto which the first electrode 503 is disposed or into which it is incorporated. Suitable substrate materials include, but are not limited to, plastics, fabrics, paper, or synthetic paper.

In FIGS. 6A and 6B, the medium 502 changes its display state, and as a result that of the display unit 500, by electrophoresis. Specifically, application of different electric potentials to electrodes 503, 504 establishes an electric field across capsule 525. The electric field causes particles 522 to migrate towards the electrode of opposite charge, either 503 or 504. There may be exactly one pair of electrodes 503, 504 per capsule 525, multiple pairs of electrodes 503, 504 per capsule 525, or a single pair of electrodes 503, 504 may span multiple capsules 525. Referring to FIG. 6A, if the particles 522 migrate towards the "top" electrode 504, the display unit displays the optical property of the particles 522 to the viewpoint 501. Conversely, referring to FIG. 6B, if the particles 522 migrate towards the "bottom" electrode 503, the display unit displays the optical property of the fluid 524 to the viewpoint 501.

There are many ways in which the display state change may be accomplished. In one embodiment, the suspending fluid 524 is dyed to provide a color contrast with the particles 522. In one embodiment the suspending fluid 524 is white and the particles 522 black. In another embodiment, the suspending fluid 524 is black and the particles 522 white. Referring again to FIG. 6A, application of an electric field across the capsules 525 causes the particles 522 to move to the "top" of the capsule, FIG. 6A, thereby displaying the color of the particles 522 to the viewpoint 501. According to the present invention, the particles 522 may have a density matched to the specific gravity of the fluid 524 to produce a bistable display; and as a result, the particles 522 remain at the "top" of the capsule 525 after the electric field is withdrawn. Consequently, no power is required to maintain the display state. Thus, the only real current draw of the display of the present invention is in changing the charge of the electrodes on either side of the electrophoretic medium. Accordingly, the display state is changed by application of a different electric field across the capsules 525 that causes the particles 522 to move to the "bottom" of the capsule, FIG. 6B, thereby displaying the color of the fluid 524 to viewpoint 501. In a preferred embodiment, at least one of the electrodes 503, 504 is configured to permit application of an electric field to select portions of the medium 502, that is, the electrode configuration permits the medium to be "addressed." Suitable electrode configurations include, but are not limited to, matrix grid patterns, interleaved grid patterns, and mosaic font patterns. Alternatively, in another embodiment, the electrodes may be configured so that the particles migrate to the "side" of the capsule, i.e., a "shutter mode" configuration, and thereby display an optical property of the first electrode 503 to viewpoint 501 if the suspending fluid 524 is clear. The amount of time for which the electric field must be applied to move the particles to the "top," "bottom," or "side" of the capsule can be determined from the electrophoretic mobility of the particles, the strength of the applied electric field, and the size of the capsule.

Figure 7A:
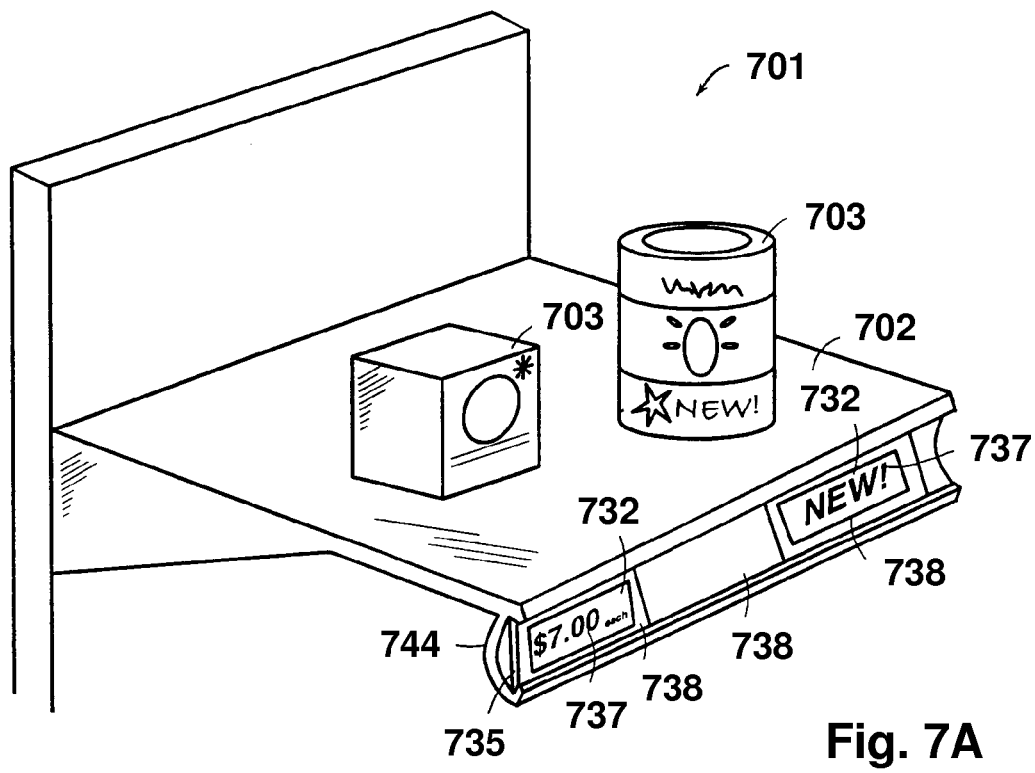
FIGS. 7A and 7B illustrate various electronic display devices of the present invention in use displaying goods.

In one embodiment, instead of using one electrophoretic display unit as an ESPL for each SKU, the present invention uses an electrophoretic display unit that comprises a single long strip comprising a display that is capable of displaying messages at many points across its width. This permits the display to be hardwired to the shelf, yet the location of the information can be shown beneath the relevant product even when the product is physically moved. In a preferred embodiment, such a strip display would be able to show bar code, SKU and price data. Referring to FIG. 7A, one embodiment of a device for the electronic display of information on a storage surface comprising a strip display is illustrated. In a preferred embodiment, the storage surface 701 comprises a shelf 702 for supporting goods 703 and an extension 704 with a strip display 735 disposed thereon. As illustrated, in a preferred embodiment the extension 704 comprises the standard channel groove provided on a standard gondola-type shelf 702. In one embodiment, the strip display 735 is disposed on the extension 704 by flexing the display unit so that the upper and lower edges 706 and 707 of the display unit fit into the recesses 708 and 709 of the extension channel. In another embodiment, the strip display 735 is disposed on the extension 704 by sliding the strip display into the channel groove from the end of the groove. In a preferred embodiment, the strip display comprises an electrophoretic display unit capable of displaying more than one message 737 along its length and comprising at least two segments 738 in electrical communication with each other and with independently updateable electronic ink display segments 732.

In another embodiment, the strip display further comprises a permanent label capable of transmitting its location to a control mechanism that in turn updates the product information or price on the portion of the strip display directly adjacent to the permanent label. In this embodiment, the store employee can move a product and, simply by moving the permanent label, cause the price to be updated to the correct shelf. In one embodiment, the permanent label is embedded with a unique serial code.

Figure 7B:
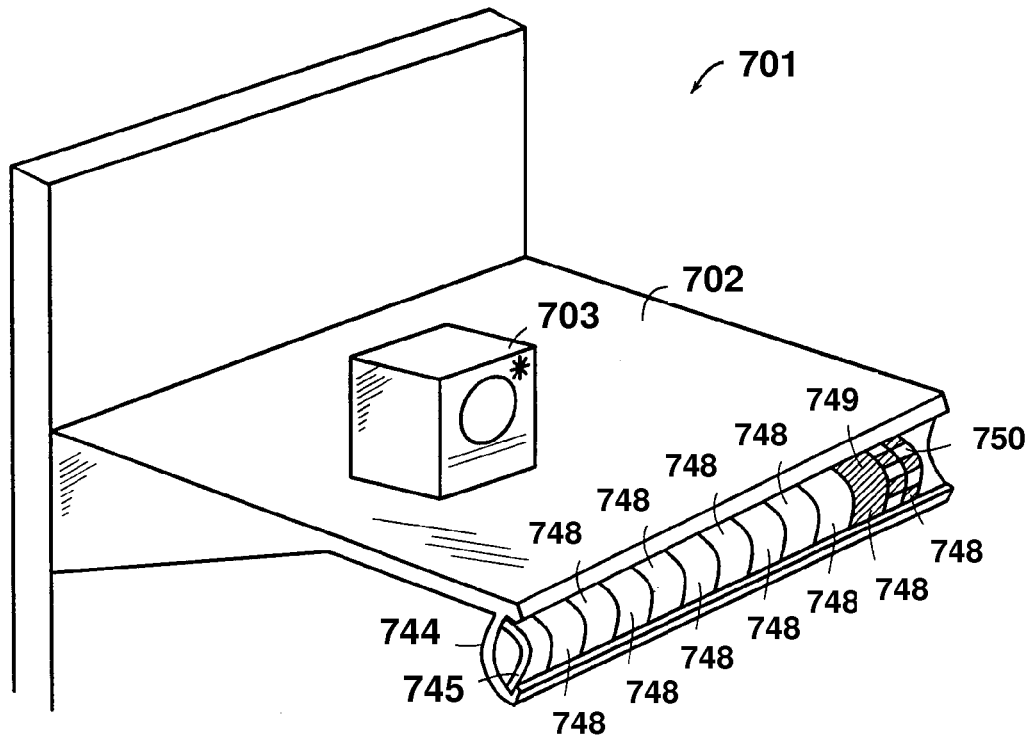

In another embodiment, an alternate or adjunct to an ESPL system of electrophoretic display units that offers yet another retail application of encapsulated electrophoretic media ink is a storage surface "highlighting" display strip. According to the present invention, and referring to FIG. 7B, a "highlighting" display strip 745 is capable of displaying only a small number of "pixels," i.e., display elements 748. For example, on one embodiment, the highlighting display strip 745 is 3 feet wide and ¼ inch tall; the strip is split into display elements 748 that are each 3 inches wide; and thus, the strip in this embodiment contains just 12 display elements. This greatly reduces cost. Each display element 748 of the highlighting display strip comprises a display with an "on" display state and an "off" display state. Such display states include, for example, effects such as solid colors 749 or color patterns 750. In addition, a highlighting display strip display element may be cyclically switched on and off and create a blinking effect. Referring again to FIG. 7B, in one embodiment, a highlighting display strip 745 runs along the edge 744 of product-holding display 701, and may be proportioned to fit easily into a gondola-type or other retail fixture. In one embodiment, the highlighting display strip 745 comprises a multiple display elements 748. By activating display elements beneath certain shelf portions, the retailer may communicate product information. For example, all sale items may be highlighted by display elements displaying a red color underneath them. This information may be driven from a data source so that, for example, the overall length of the activated display elements corresponds to the correct width of the product facing according to "plan-o-gram" data of the store. In this manner, during shopping hours the retailer may highlight sales and specials. During restocking hours the owner may highlight products that must be restocked or repositioned.

Figure 8A:
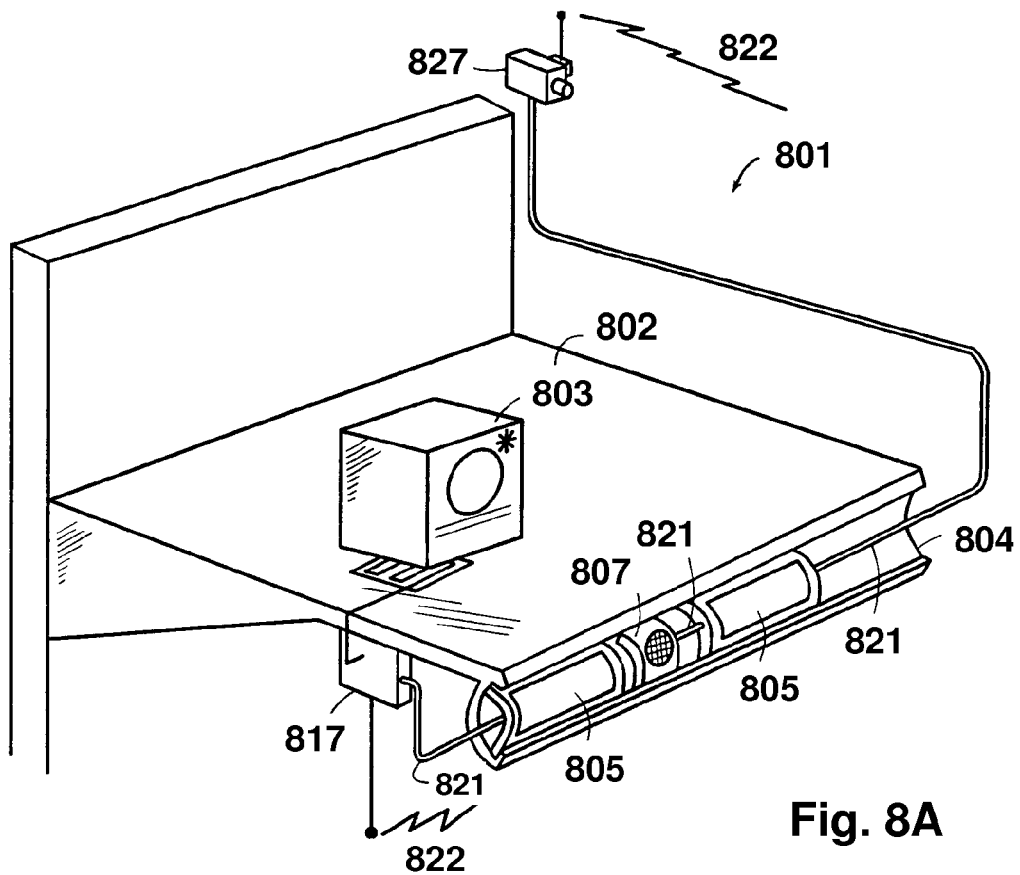
FIGS. 8A–8C illustrate electronic display devices of the present invention in use, together with a unit for updating the display devices.
Figure 8C:
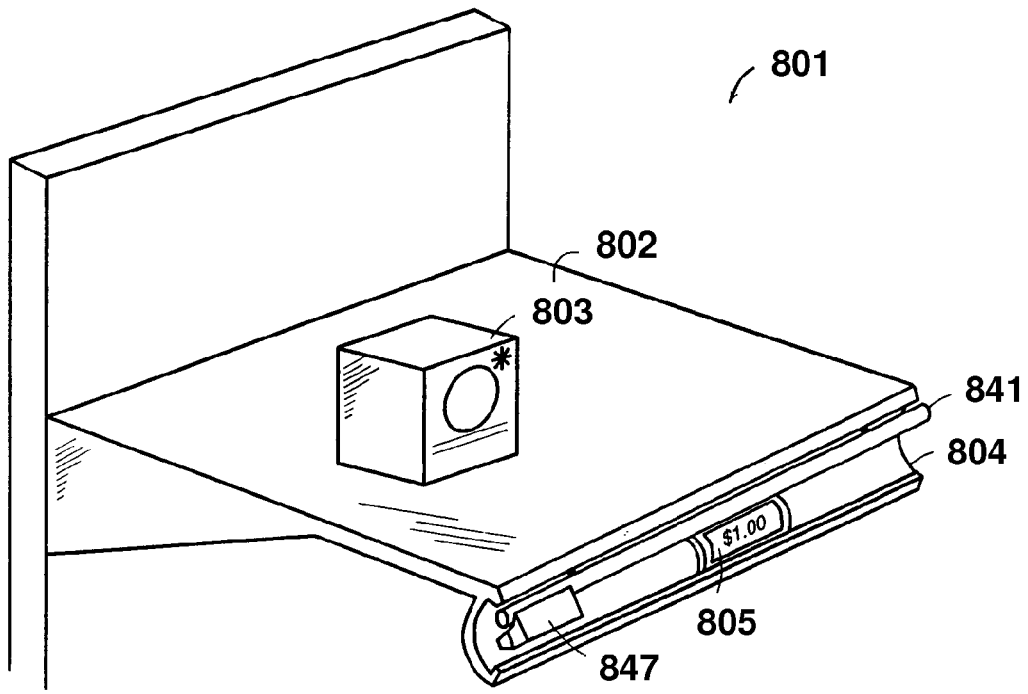
Figure 8B:
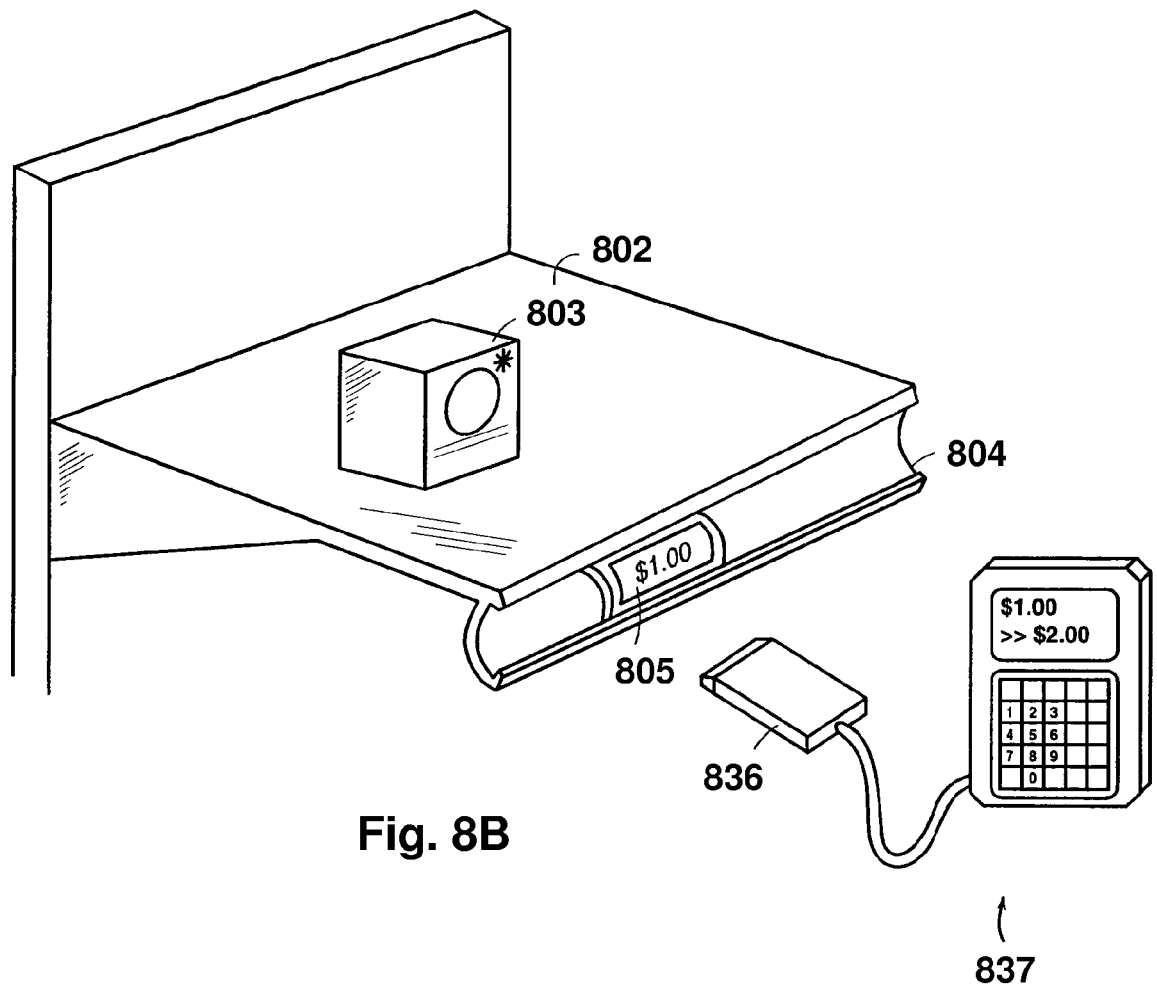

In another embodiment, the device for the electronic display of information on a storage surface comprising an electrophoretic display unit of the present invention further comprises an information updating unit that communicates an electrical signal to an electrophoretic display unit, or group of electrophoretic display units, to change the message displayed. Referring to FIGS. 8A to 8C, in a preferred embodiment, the storage surface 801 comprises a shelf 802 for supporting goods 803 and an extension 804 with at least one electrophoretic display unit 805 disposed thereon and an information updating unit 807, 817, 827, 837, 847 in electrical communication 821, 822 with at least one electrophoretic display unit. In some embodiments, as illustrated in FIGS. 8A and 8C, the information updating unit 807, 817, 827, 847 is disposed adjacent the storage surface 801. In another embodiment, the information updating unit and electrophoretic display unit are integrated on a common substrate. In other embodiments, as illustrated in FIG. 8B, the information updating unit 837 is external to and detached from the storage surface 801. The information updating unit may be in electrical communication 821, 822 with a single electrophoretic display unit 805 or a plurality of electrophoretic display units. The information updating unit may be in electrical communication with an electrophoretic display unit 805 via hardwires 821, inductive transmission 822, piezoelectric transmission, photovoltaic transmission, or any other suitable means of electrical communication. The primary function of the information updating unit is to change the display state, or message, of the electrophoretic display unit 805 or units in response to an update signal. In response to the update signal, the information updating unit communicates an electrical signal to either, a first electrode, a second electrode, or both, of the electrophoretic display unit 805 or units to change the display state. The term "update signal" is used to include any information that can be utilized by the information updating unit including, but not limited to, analog signals and digital signals. The update signal can comprise codes describing how the electrophoretic display unit should display or transition between messages, or any other suitable information that will cause the electrophoretic display unit 805 or units to operate as desired by the retailer. Accordingly, the update signal can also include a header, error-checking, checksum, routing or other information that facilitates the function of the information updating unit and/or electrophoretic display unit. In one embodiment, the update signal is an RF signal that provides electric energy via induction to power the display state change of the electrophoretic display unit. The update signal can comprise, for example, an electrical signal, a RF or radio-wave signal, an infrared signal, or even an audio signal. Accordingly, the update signal can be communicated by wire or wireless communication.

The update signal is usually transmitted together with the specific address code for the respective electrophoretic display unit 805 or the respective group of display units, as well as price and/or product information for the goods in question. In this manner, it is possible to modify the indicated prices, such as for a special sale with reduced prices, with little expense or effort. The information updating unit may receive an update signal by any suitable means including, but not limited to, wire transmission, wireless transmission, surface contact pad on the surface, infra-red (IR) port, optical sensor, audio sensor, or induction loop. In one embodiment, the update signal may be provided by a central control mechanism, such as, for example, a local store computer, a regional computer, or a national computer. In other embodiments, as illustrated in FIG. 8A, the information updating unit comprises a sensor 807, 817, 827 and the update signal is a response to an environmental condition detected by the information updating unit (as sensor) 807, 817, 827 disposed adjacent the storage surface 801. In one embodiment, the sensor is an audio sensor 807. In another embodiment, the sensor is an optical or IR sensor 827. In another embodiment, the sensor is a pressure sensor 817. However it is to be understood that the information updating unit may comprise any sensor suitable to the retail environment. Suitable sensors include, but are not limited to, audio, optical, pressure, motion and IR sensors. In preferred embodiments, the power for the generation of a sensor signal generated in response to an environmental condition comes from the environmental condition itself. For example, for a pressure sensor, power could be generated by the piezoelectric effect or triboelectric effect, while for an optical sensor, power could be generated by the photovoltaic effect. In another embodiment, the information updating unit comprising a sensor further comprises a logic circuit that updates the information displayed by the electrophoretic display unit based on and in response to the environmental condition. In this embodiment, it is preferred that the logic circuit contain suitable embedded software. Examples of suitable embedded software are discussed below.

In one embodiment, the information updating unit comprises a logic circuit that updates the information displayed by the electrophoretic display unit based on and in response to the update signal. In one preferred embodiment, the information updating unit comprising a logic circuit is integrated with the electrophoretic display unit on a common substrate. In a preferred embodiment, the logic circuit contains embedded software which facilitates updating the electrophoretic display unit. In one embodiment, the embedded software includes an event scheduler. In a preferred embodiment, the event scheduler is tied in to a system clock that is used to determine when to activate the information updating unit and update the associated electrophoretic display unit or units. In another embodiment, the embedded software comprises a communications module which activates the information updating unit, receives the update signal data, determines whether the update signal received is relevant to the electrophoretic display unit, and if so, updates the display state of the electrophoretic display unit. In another embodiment, the embedded software further monitors the update signal data received and attempts to handle any errors that may be detected in download. In another embodiment, the embedded software includes a script interpreter. The script interpreter accesses specific data stored in embedded software memory and analyzes the update signal data content to cause changes and updates to the associated electrophoretic display unit or units. The script interpreter therefore, in one embodiment, controls the display of prices, text, images and graphics, as well as effects such as fades, wipes, wiggling, blinking, flashing, and so forth. In still another embodiment, if a script contains a reference to time then the interpreter will fill in the appropriate value from a system clock.

Referring to FIG. 8B, in one embodiment the information updating unit 837 comprises a second electrode 836. In one embodiment, the second electrode 836 of the information updating unit comprises an electrostatic print head; in another, it comprises a charged stylus. The electrostatic print head permits very high resolution addressing of the electronic ink of the electrophoretic display unit. In one embodiment of the present invention, the electronic ink of the electrophoretic display unit is electrostatically writable. This electrostatically writable electrophoretic display unit may be incorporated with a non-electrostatically writable electrophoretic display unit, such as in a display strip, such that portions of the overall display can be updated by the electrostatic print head whereas other portions will be unaffected. In one embodiment, the display of the electrostatically writable electrophoretic display unit may be updated, i.e., rewritten, by a handheld information updating unit comprising an electrostatic print head. In another embodiment, electrical charge is built up on the surface of the electronic ink for changing the display state thereof through frictional or triboelectric charging; in another embodiment, by using a sheet of piezoelectric material.

Referring to FIG. 8C, in another embodiment, the device for the electronic display of information on a storage surface comprising an electrostatically writable electrophoretic display unit 805 of the present invention further comprises a track 841 disposed along the extension 804 and a information updating unit 847 comprising an electrostatic print head is slidably disposed on the track 841 such that the information updating unit 847 can come into electrical communication with an electrophoretic display unit 805 and update the display thereof. In this embodiment, the information updating unit 847, in response to an update signal, moves along the track 841 until it comes into electrical communication with the appropriate electrophoretic display unit. The information updating unit 835 then electrostatically changes the display state of, i.e., rewrites, the electrophoretic display unit and thereby updates the display.

Figure 9:
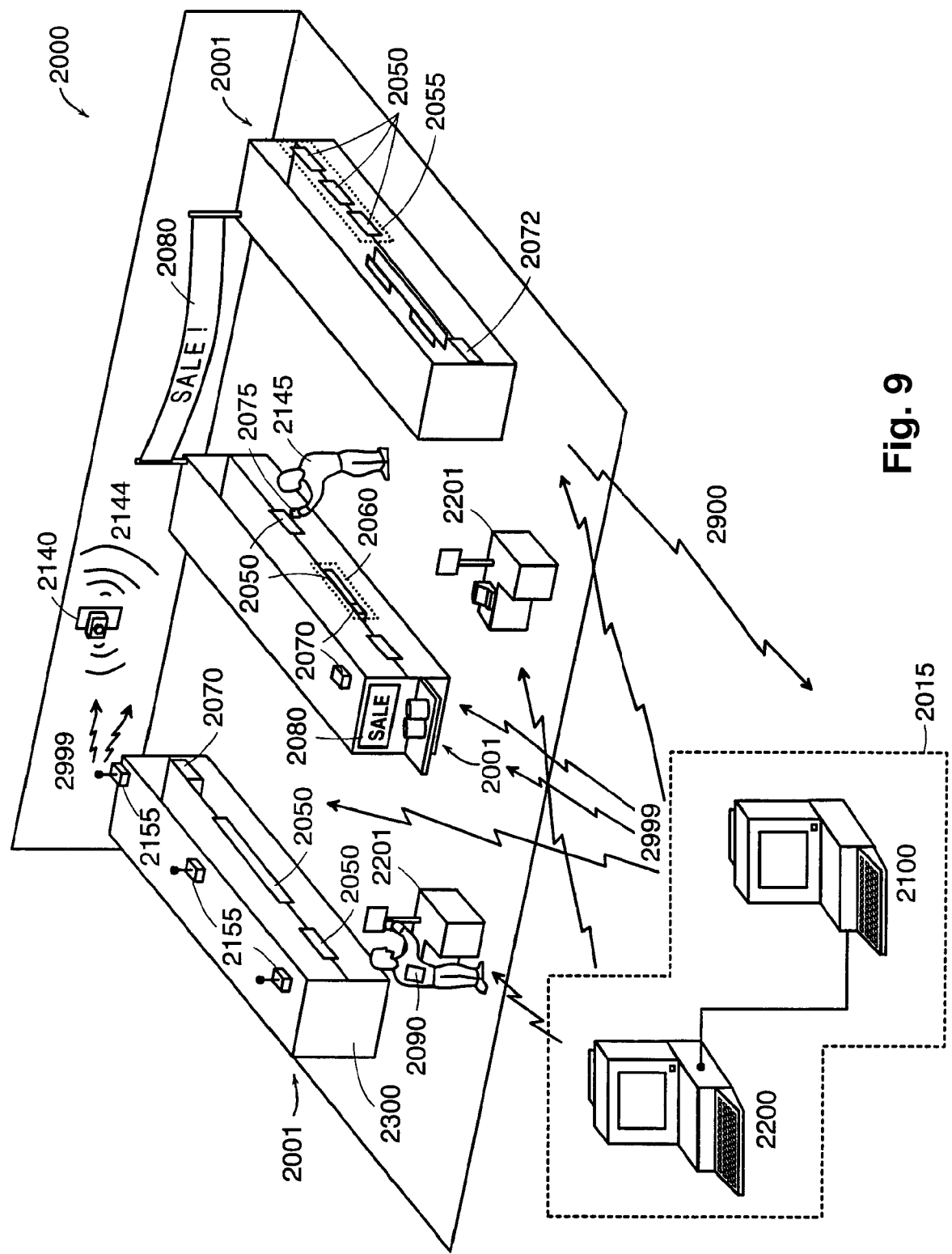
FIG. 9 illustrates a store wide product information and price display system using electronic display devices of the present invention.

This invention also seeks to provide a store wide product information and price display system. The primary function of the store wide product information and price display system (hereinafter "store wide product system") is to ensure that updates in product information and price are both consistent throughout the store and are rapidly posted with a minimum of manual labor. Referring to FIG. 9, in one embodiment, the store wide product system 2000 comprises electrophoretic display units 2050, information updating units 2070, and a control system 2100 which enables a retailer to create and transmit update signals to the information updating units 2070 and thereby change the display state of select electrophoretic display units 2050 throughout the store. An information updating unit may be in electrical communication with a single electrophoretic display unit 2050 or a group of electrophoretic display units 2055. As discussed above, the information updating unit may comprise, for example, an IR sensor, an audio sensor, a radio-frequency antenna, or any device that is able to receive the update signal 2999. In one preferred embodiment, the information updating unit comprises an RF antenna and receives the update signal via induction. The information updating unit may further comprise a suitable transmitter that is able to communicate with the control system. In one embodiment, this transmitter enables the information updating unit to communicate information obtained from information updating units that comprise a sensor 2072. In one embodiment, for example, an information updating unit comprising a shelf pressure sensor may communicate 2900 to the control system 2100 when a shelf is empty, or almost empty, of particular goods and thereby "flag" such goods for restocking or reorder. The information updating units may act as members of a wired or wireless daisy chain of update signal transceivers. The information updating units 2070 and electrophoretic display units 2050 may be powered by any suitable means including AC outlet, DC converter, induction loop, capacitive coupling, battery, or solar cell. In preferred embodiments, the information updating units and electrophoretic display units are powered by induction, battery, and/or solar cell.

In another embodiment, the store wide product system 2000 further comprises electronic signage 2080 which may comprise electronic ink signage or other electronic signage updateable by control system 2100. In certain embodiments, an information updating unit and at least one electrophoretic display unit together comprise an integrated display unit 2060. In still another embodiment, an integrated display unit, an electrophoretic display unit or electronic ink signage may be incorporated into employee clothing 2090, such as a jacket, and thereby provide a mobile display that nevertheless can be almost instantly updated with information that is consistent throughout the store. In a preferred embodiment, the control system 2100 of the store wide product system 2000 is integrated into the POS data system 2200, or comprises the POS data system. In this embodiment the retailer can, from a centrally located control center 2105, update product information and price while ensuring that the price the consumer has been lead to believe a product cost from the labels and signage at the POD 2001, will match the price registered at the POS 2201.

In one embodiment, wireless radio-wave communication devices and methods are used to communicate the update signal 2999 to the information updating units 2070. In one embodiment, each information updating unit 2070 is outfitted with a short range wireless transceiver and update signals are transmitted from information updating unit to information updating unit in a daisy chain manner. In another embodiment, each information updating unit has a short-range radio antenna capable of receiving only nearby update signals, for example, signals from a distance of no more than 6–12 inches. Referring again to FIG. 9, small, inexpensive transmitters 2155 are installed near the storage surface 2300. In this embodiment, a control system 2100 communicates a signal to the transmitters 2155 which in turn transmit an update signal 2999 to the nearby information updating unit 2070. The short receiving ranges permit only a few information updating units to receive a given signal from a given transmitter and thereby reduce the addressing complexity that must be handled by an information updating unit itself. Further, the transmission of RF data over short distances is sufficient not only to power simple logic circuitry by induction but is also sufficient to power by induction the change of the display state of an electrophoretic display unit 2050. After the RF signal fades, the electrophoretic display unit 2050 of the present invention has been set to a new message and holds this message without power consumption until updated again.

In another embodiment, update signals are communicated by audio transmission. In this embodiment, the information updating unit 2070 comprises a sound wave-sensing device, such as a microphone, and a logic circuit. Appropriate embedded software of the logic circuit analyzes the sound using, for example, techniques used in acoustic coupling modems, noise cancellation, automatic gain control, speech verification, speaker identification, and/or speech recognition, to determine whether an instruction to update the display of an electrophoretic display unit or units has been received. This embodiment offers several advantages: (1) extreme low cost and low power draw; (2) it is unaffected by direct sunlight levels unlike infrared signal transmission; and (3) it is immune to and does not create RF interference. In one embodiment, a loudspeaker 2140 transmits update signals as sound waves 2144, preferably at a frequency outside of the range of human hearing, across the store or a region of the store. Loudspeakers could be located either in fixed locations and/or on mobile locations such as a special cart that is rolled up and down the aisles periodically. In another embodiment, a customer or store employee 2145 simply speaks a command phrase and the logic circuit analyzes the sound and the information updating unit changes the display state of the electrophoretic display unit accordingly. For example, command phrases such as, "COST," "PEANUTS," and "CALORIES," could be used to cause the electrophoretic display unit to display, respectively, information about product cost, whether a food product contains peanuts or peanut oil, and the number of calories of a food product.

In another embodiment, a store employee and/or customer employs a handheld information updating unit 2075, such as a smart card with transceiver or a store-supplied handheld shopping device that may be customized to the shopper, to update the display state of an electrophoretic display unit. For example, when a customer brings the handheld information updating unit 2075 into electrical communication with an electrophoretic display unit 2050, perhaps by touching the handheld information updating unit to the electrophoretic display unit or by induction, alternative information is posted for the customer. For example, the customer may wish to know whether a food product meets vegetarian requirements or contains substances, such as peanut oil, that can cause fatal allergic reactions in many individuals or specific customer. Or the customer may enter an order for a product associated with the electrophoretic display unit and wish to see visual confirmation by a change in the electrophoretic display unit display state. Or, the shopper may offer to buy the product at an alternate price and a logic circuit integrated with the electrophoretic display unit or the handheld information updating unit decides to "accept" or "reject" the offer. In addition, the logic circuit may use information from sensors associated with the ESPL system, such as shelf mounted pressure sensors that indicate the amount of product on display, to decide whether to "accept" or "reject" an alternate price offer.

In one embodiment, the control system 2100 features a user interface that permits the retailer to transmit update signals to update product information and price at the POD 2001. In another embodiment, the control system 2100 functions as a inventory tracking and accounting system that monitors product supply, places and/or verifies product orders, keeps account of product sales, and/or creates reports correlating changes in POD 2001 information and price with POS sells. The control system 2100 may also utilize multiple authority levels allowing different parties to variously update product price and product information for select products or for all products store wide; all from the same control system 2100.

The flexible, electrophoretic ink display described above is useful in numerous retail applications where paper is currently the display medium of choice. The displays can be rolled or bent. In other embodiments, the displays can be placed onto or incorporated into highly flexible plastic substrates, fabric, paper, or synthetic paper. Since the displays can be rolled and bent without sustaining damage, they form large-area displays which are highly portable. Since these displays can be printed on plastics they can be lightweight. In addition, the printable, electrophoretic display of the present invention can maintain the other desirable features of electrophoretic displays, including high reflectance, bistability, and low power consumption. Electrophoretic display media are described in more detail in the aforementioned E Ink and MIT patents and applications.

In combining the embodiments above, it can be seen that the displays of the present invention offer a way for retailers to dramatically change the store environment so that the store may become more interactive and individualized, yet at the same time, achieve higher standards of compliance with less labor cost and faster turnaround times.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

What is claimed is:

1. A reflective electro-optic display having a bar code display area arranged to display a bar code readable by a bar code scanner, the display comprising an electrophoretic electro-optic medium, the electrophoretic medium comprising a plurality of electrically charged particles suspended in a suspending fluid and capable of moving through the suspending fluid on application of an electrical field thereto, the electrically charged particles and the suspending fluid being confined within a plurality of capsules or microcells.

2. An electro-optic display according to claim 1 having a visual message display area separate from the bar code display area and arranged to display at least one indicium selected from the group consisting of alphanumeric characters and graphics.

3. An electro-optic display according to claim 1 wherein the bar code display area is arranged to display a one-dimensional bar code.

4. An electro-optic display according to claim 3 wherein the bar code display area is provided with a plurality of parallel elongate electrodes and drive means for applying to the elongate electrodes differing voltages, thereby causing the electro-optic display to display the bar code.

5. An electro-optic display according to claim 1 having a writing means movable linearly relative to the bar code display area, the writing means having at least one electrode capable of writing on the bar code display area.

6. An electro-optic display according to claim 5 wherein the writing means is provided with a plurality of electrodes and means for varying the voltages applied to the electrodes as the writing means is moved relative to the bar code display area, so that the writing means writes a two-dimensional bar code on the bar code display area.

7. An electro-optic display according to claim 1 having input means for receiving data from an source external to the display or from a sensor, and for varying at least one area of the display dependent upon the data.

8. An electro-optic display according to claim 7 further comprising a sensor arranged to supply data to the input means.

9. An electro-optic display according to claim 8 wherein the sensor comprises at least one of a shock sensor, a temperature sensor and a timer.

10. An electro-optic display according to claim 1 further comprising a power source.

11. An electro-optic display according to claim 1 further comprising a pick-up coil arranged for inductive coupling to an external power source.

12. An electro-optic display according to claim 1 wherein the suspending fluid is a gas.

13. Apparatus for the display of goods, the apparatus comprising a surface for supporting the goods, and an electro-optic display according to claim 1 disposed adjacent the surface for supporting the goods.

14. Apparatus according to claim 13 wherein the surface for supporting the goods comprises a shelf, the shelf having an extension forming a channel arranged to receive the electro-optic display.

15. Apparatus according to claim 14 wherein the electro-optic display is flexible so that it can be bent for insertion into the channel.

16. Apparatus according to claim 13 wherein the suspending fluid is a gas.

17. A reflective electro-optic display having a bar code display area arranged to display a bar code readable by a bar code scanner, the bar code display area being arranged to display a one-dimensional bar code and being provided with a plurality of parallel elongate electrodes and drive means for applying to the elongate electrodes differing voltages, thereby causing the electro-optic display to display the bar code.

18. Apparatus for the display of goods, the apparatus comprising a surface for supporting the goods, and an electro-optic display according to claim 17 disposed adjacent the surface for supporting the goods.

19. A reflective electro-optic display having a bar code display area arranged to display a bar code readable by a bar code scanner, the display having a writing means movable linearly relative to the bar code display area, the writing means having a plurality of electrodes capable of writing on the bar code display area, the writing means further comprising means for varying the voltage applied to the electrodes as the writing means is moved relative to the bar code display area, so that the writing means writes a two-dimensional bar code on the bar code display area.

20. Apparatus for the display of goods, the apparatus comprising a surface for supporting the goods, and an electro-optic display according to claim 19 disposed adjacent the surface for supporting the goods.

* * * * *